US010137915B2

(12) United States Patent
LeFebvre et al.

(10) Patent No.: US 10,137,915 B2
(45) Date of Patent: Nov. 27, 2018

(54) SYSTEM AND METHOD FOR DETECTING OPERATIONAL ANOMALIES IN TRAIN CONSISTS AND RAILCARS

(71) Applicant: Amsted Rail Company, Inc., Chicago, IL (US)

(72) Inventors: William LeFebvre, West Chester, PA (US); Andrew Martin, West Chester, PA (US); Francis James Cooper, Downingtown, PA (US); Rachel W. Adamec, Norristown, PA (US)

(73) Assignee: AMSTED RAIL COMPANY, INC., Chicago, IL (US)

( * ) Notice: Subject to any disclaimer, the term of this patent is extended or adjusted under 35 U.S.C. 154(b) by 0 days.

(21) Appl. No.: 15/108,065

(22) PCT Filed: Dec. 24, 2014

(86) PCT No.: PCT/US2014/072380
§ 371 (c)(1),
(2) Date: Jun. 24, 2016

(87) PCT Pub. No.: WO2015/100425
PCT Pub. Date: Jul. 2, 2015

(65) Prior Publication Data
US 2016/0325767 A1 Nov. 10, 2016

Related U.S. Application Data

(60) Provisional application No. 61/920,700, filed on Dec. 24, 2013.

(51) Int. Cl.
*B61L 27/00* (2006.01)
*B61L 15/00* (2006.01)
(Continued)

(52) U.S. Cl.
CPC ............ *B61L 27/0094* (2013.01); *B61K 9/00* (2013.01); *B61K 9/04* (2013.01); *B61L 15/0027* (2013.01);
(Continued)

(58) Field of Classification Search
CPC ...... B60T 17/22; B61L 15/00; B61L 15/0018; B61L 15/0027; B61L 15/0054;
(Continued)

(56) References Cited

U.S. PATENT DOCUMENTS 3,718,040 A 2/1973 Freeman et al.
5,446,451 A 8/1995 Grosskopf, Jr.
(Continued)

FOREIGN PATENT DOCUMENTS

EP 1548419 A1 6/2005
EP 2650191 A1 10/2013
(Continued)

OTHER PUBLICATIONS

Office Action dated Jul. 3, 2018 issued by Japanese Patent Office in related Japanese Patent application 2016-542732.
(Continued)

*Primary Examiner* — Jason C Smith
(74) *Attorney, Agent, or Firm* — Fox Rothschild LLP

(57) ABSTRACT

A system for monitoring railcar and tram consist operational parameters and detecting anomalies in the operation and condition thereof using sensors to feed data to a distributive complex event processing engine.

37 Claims, 14 Drawing Sheets

(51) Int. Cl.
*B61K 9/00* (2006.01)
*B61K 9/04* (2006.01)
*B61L 25/02* (2006.01)
*G01M 17/10* (2006.01)

(52) U.S. Cl.
CPC ......... *B61L 15/0081* (2013.01); *B61L 25/021* (2013.01); *B61L 25/025* (2013.01); *B61L 27/0077* (2013.01); *G01M 17/10* (2013.01); *B61L 15/0036* (2013.01)

(58) Field of Classification Search
CPC ... B61L 15/0072; B61L 15/0081; G01K 7/02; G06F 19/00; G08B 21/18
See application file for complete search history.

(56) References Cited

U.S. PATENT DOCUMENTS

| | | | |
|---|---|---|---|
| 5,603,556 | A | 2/1997 | Klink |
| 5,682,139 | A | 10/1997 | Pradeep et al. |
| 5,691,980 | A | 11/1997 | Welles, II et al. |
| 6,175,784 | B1 | 1/2001 | Jicha et al. |
| 6,184,798 | B1 | 2/2001 | Egri |
| 6,301,531 | B1 | 10/2001 | Pierro et al. |
| 6,339,397 | B1 | 1/2002 | Baker |
| 6,668,216 | B2 | 12/2003 | Mays |
| 7,336,156 | B2 * | 2/2008 | Arita ........................ H04B 3/60 180/2.1 |
| 7,688,218 | B2 * | 3/2010 | LeFebvre ................. B61K 9/00 246/169 R |
| 7,698,962 | B2 * | 4/2010 | LeFebvre ................ B61F 5/305 177/136 |
| 8,244,411 | B2 | 8/2012 | Baker |
| 8,370,006 | B2 * | 2/2013 | Kumar .................... B61L 3/006 701/19 |
| 8,672,273 | B2 | 3/2014 | Brown et al. |
| 8,751,290 | B2 | 6/2014 | Schullian et al. |
| 9,365,223 | B2 | 6/2016 | Martin et al. |
| 9,663,092 | B2 | 5/2017 | Martin et al. |
| 2004/0201464 | A1 | 10/2004 | Oonishi |
| 2005/0259619 | A1 | 11/2005 | Boettle et al. |
| 2006/0264221 | A1 | 11/2006 | Koike et al. |
| 2007/0241610 | A1 * | 10/2007 | Smith ..................... B60T 13/66 303/22.6 |
| 2008/0195265 | A1 * | 8/2008 | Searle ...................... B61K 9/04 701/19 |
| 2009/0001226 | A1 * | 1/2009 | Haygood ................. B61K 9/00 246/169 S |
| 2009/0173840 | A1 * | 7/2009 | Brown ................ B61L 15/0027 246/1 R |
| 2010/0200307 | A1 * | 8/2010 | Toms ................... G01G 19/042 177/163 |
| 2011/0270475 | A1 * | 11/2011 | Brand ................. B61L 15/0027 701/20 |
| 2011/0282540 | A1 * | 11/2011 | Armitage ................. H04Q 9/00 701/31.4 |

FOREIGN PATENT DOCUMENTS

| | | |
|---|---|---|
| JP | 05213195 A | 8/1993 |
| JP | 05343294 | 12/1993 |
| JP | 08015099 | 1/1996 |
| JP | 10217968 | 8/1998 |
| JP | 11192948 | 7/1999 |
| JP | 2004294419 A1 | 10/2004 |
| JP | 2009210301 A | 9/2009 |
| WO | 2001015001 A2 | 1/2001 |
| WO | 2005105536 A1 | 10/2005 |

OTHER PUBLICATIONS

"Mechanical Engineering Test Technologies", Han Jianhai, et al., Beijing China: Tsinghua University Press, pp. 77-80, May 2010.
Office Action dated Aug. 31, 2018 issued by the CPO in related Chinese patent application 201480076070.3. References D1 and D2 as cited in the Office Action, or US equivalents thereof, were previously made of record in the present application. D1 (CN101346268A) is a Chinese equivalent of U.S. Pat. No. 7,688,218.

\* cited by examiner

SYSTEM AND METHOD FOR DETECTING OPERATIONAL ANOMALIES IN TRAIN CONSISTS AND RAILCARS

RELATED APPLICATIONS

The application claims the benefit of U.S. provisional application 61/920,700, filed Dec. 24, 2013, the entirety of which is hereby incorporated herein by reference.

FIELD OF THE INVENTION

The present invention relates to the field of railcar and train safety management, and is specifically directed to a system and method for continuously collecting and analyzing operational parameters of railcars and train consists to detect anomalous operating conditions.

BACKGROUND OF THE INVENTION

Current prior art monitoring of bearings and wheel to rail interactions on train consists has been managed primarily through the use of wayside detectors located throughout the rail system, which includes detectors for monitoring the temperature of railcar wheel bearings, and wheel impact load detectors which identify damaged wheels by monitoring impacts of wheels on the rails. These detectors are installed at fixed points in the rail network.

Since their introduction, these methods have provided railroad operators with information to improve railcar and train consist performance. However, these detectors lack the benefits of a wireless network capable of transmitting information and data regarding operational anomalies, such as when a railcar derails, the condition of the bearings and wheels when not in range of detectors, and wheel damage. Further, these prior methods do not provide a mechanism to continuously monitor assets at any location in the rail network.

Wheel damage in the railroad industry is responsible for significant maintenance costs related to the railcar wheels, railcar body, railcar components, rail tracks and rail ties. Wheels that are slid flat have an uneven section on the wheel where it comes into contact with the rail. As the wheel rotates this section creates an abnormal impact pattern, which can cause further damage to the wheel, damage to the railcar and damage to the rail and track structure.

Presently, however, there is no reliable system for continuously monitoring the temperature of wheel bearings or wheel to rail interactions where a wheel impact load detector is not installed on a section of rail or in the area between detectors. Accordingly, it is desirable to provide a system and method for the real-time, on-board monitoring of various operational parameters of a railcar and/or train consists, and for analyzing the readings in real time to predict or timely detect anomalous operational conditions.

SUMMARY OF THE INVENTION

The system presented herein addresses the deficiencies in prior art monitoring systems for railcars and train consists. The system consists of a hierarchical arrangement of components which provide a distributed data analysis capability that is capable of detecting operational anomalies at various levels of the hierarchy, and which provides for the flow of data, events and alerts to a central point.

At the lowest level of the hierarchy, each railcar is equipped with multiple wireless sensor nodes (referred to in the singular as a "WSN"), which are arranged in a mesh network controlled by a communication management unit ("CMU"), usually on the same railcar, referred to herein as a railcar-based mesh network. The wireless sensor nodes collect data regarding various operational parameters of the railcar and are capable of detecting certain anomalies based on the collected data. When anomalous operational data is detected, an alert may be raised and the data may be communicated to the communication management unit located on the railcar. Although mesh networks are used in the embodiments illustrated herein, other types of network topologies may be used.

The communication management units located on each railcar are also arranged in a mesh network which is controlled by a powered wireless gateway, typically located in the locomotive. This is referred to herein as a train-based mesh network. Again, although mesh networks are used in the embodiments illustrated herein, other types of network topologies may be used.

The train-based wireless mesh network communicates the length of the train consist and delivers information about the railcars to a powered host or control point, such as the locomotive or an asset with access to a power source and to a railroad remote operations center.

BRIEF DESCRIPTION OF THE DRAWINGS

The present invention will be more fully and completely understood from a reading of the Detailed Description of the Invention in conjunction with the drawings, in which.

DETAILED DESCRIPTION OF THE INVENTION

Figure 1:
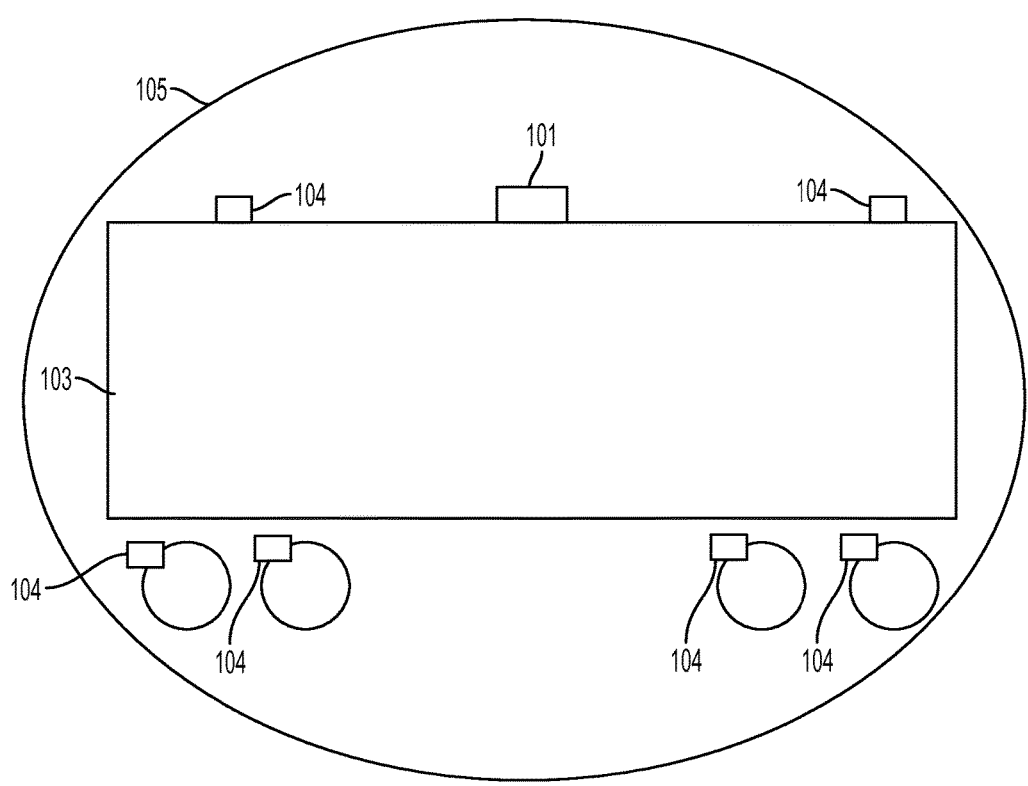
FIG. 1 is a schematic of a railcar 103 equipped with a communication management unit (CMU) 101 and a plurality of wireless sensor nodes (WSNs) 104 installed thereon, forming a railcar-based mesh network 105.

A railcar, as the term is used herein, may be a single railcar 103, see FIG. 1, or may consist of two or more railcars 103 which are permanently connected, often referred to by those of skill in the art as a "tandem pair", "three-pack", "five-pack", etc.

Figure 2:
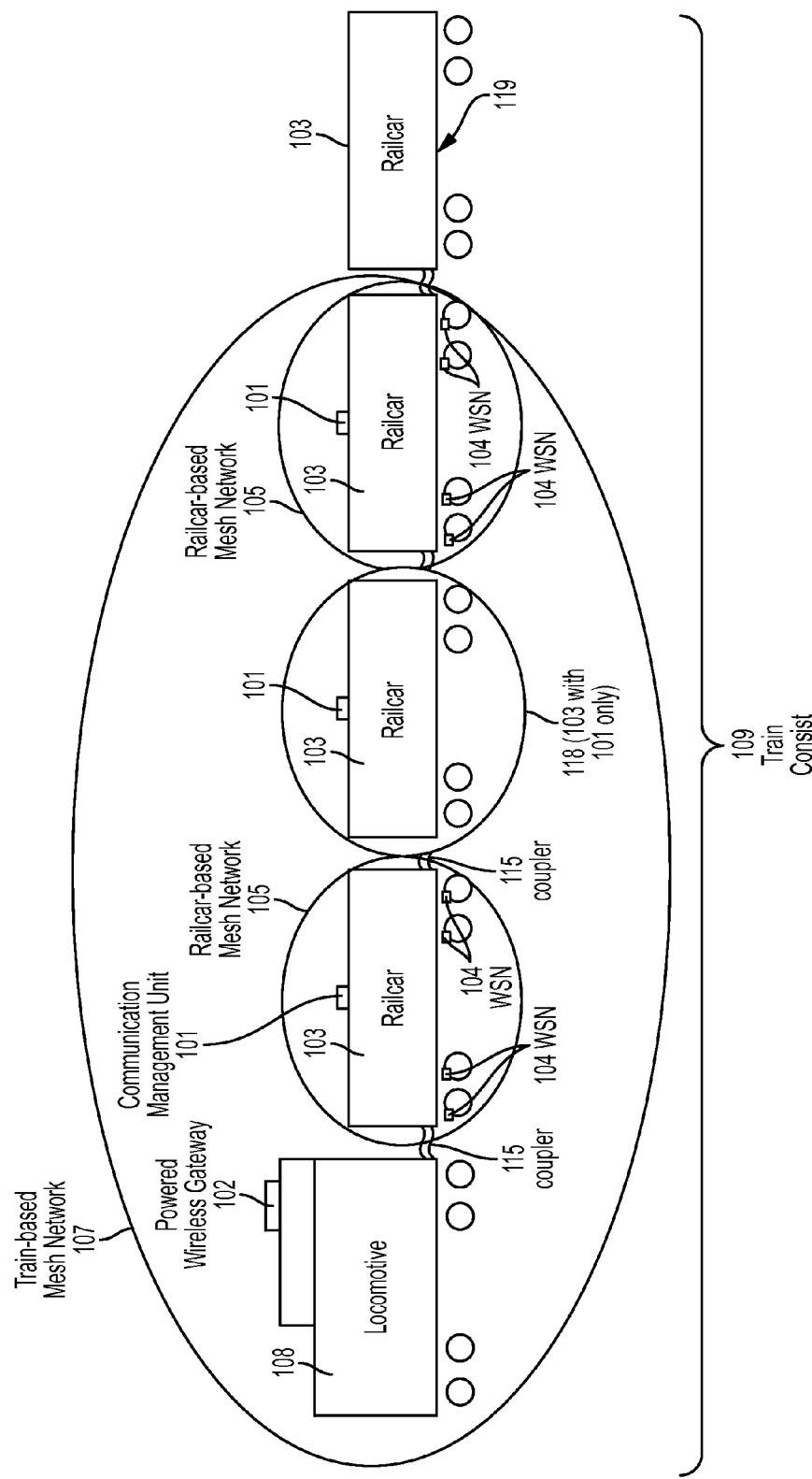
FIG. 2 is a schematic of a train-based mesh network with two railcars 103 each equipped with a CMU 101 and multiple WSNs 104, a railcar 103 equipped with just a CMU 101 (no WSNs), a railcar 103 without a CMU or WSN, and a powered wireless gateway device 102 installed on a locomotive 108.

A train consist, shown in the drawings as reference number 109, see FIG. 2, is defined as a connected group of railcars 103 and locomotives 108.

A communication management unit ("CMU"), shown in the drawings as reference number 101, is preferably located on a railcar 103 and controls the railcar-based mesh network 105 (defined below) overlaid on railcar 103 which may consist of one or more individual railcars 103 which are permanently connected together. The CMU 101 hardware preferably includes a processor, a power source (e.g. a battery, solar cell, energy harvester, or internal power-generating capability), a global navigation satellite system (GNSS) device such as a global positioning system ("GPS") receiver, Wi-Fi, satellite, and/or cellular capability, a wireless communications capability for maintaining the railcar-based mesh network 105, wireless communication with a train-based mesh network 107 and, optionally, one or more sensors, including, but not limited to, an accelerometer 404, gyroscope, or temperature sensor 406.

The CMU 101 supports one or more WSNs 104 (defined below) in a mesh network configuration using open standard protocols, such as the IEEE 2.4 GHz 802.15.4 radio standard. Additionally, the CMU 101 is also a member of a train-based mesh network 107, which consists of the CMUs 101 from all enabled railcars 103 in the train consist 109, controlled by a powered wireless gateway 102, typically located on a locomotive 108. The CMU 101 thus supports four functions: 1) to manage a low-power railcar-based mesh network 105 overlaid on a railcar 103; 2) to consolidate data from one or more WSNs 104 in the railcar-based mesh network 105 and to apply logic to the data gathered to generate warning alerts to a host such as a locomotive 108 or remote railroad operations center 120; 3) to support built-in sensors, such as an accelerometer 404, within the CMU 101 to monitor specific attributes of the railcar 103 such as location, speed, and accelerations, and to provide an analysis of this data to generate alerts; and 4) to support bi-directional communication upstream to the host or control point, such as a locomotive 108 and/or an off-train monitoring and remote railroad operations center 120, and downstream to one or more WSNs 104, located on the railcar 103. CMUs 101 may communicate wirelessly to a powered wireless gateway (PWG 102 as defined below) in a mesh network configuration, or may be configured to communicate through a wired connection, for example, through the ECP (electronically controlled pneumatic) brake system. Those skilled in the art will appreciate that GPS is just one form of a global navigation satellite system (GNSS). Other types of GNSS include GLONASS and BeiDou with others in development. Accordingly, although GPS is used in the embodiments described herein, any type of GNSS system or devices may be used.

The CMU 101 is capable of receiving data and/or alarms from one or more WSNs 104 and is capable drawing inferences from this data or alarms regarding the performance of railcar 103, and of transmitting data and alarm information to a remote receiver. The CMU 101 is preferably a single unit that would serve as a communications link to other locations, such as a powered wireless gateway 102 (preferably located in locomotive 108), or a remote railroad operations center 120, and have the capability of processing the data received. The CMU 101 also communicates with, controls and monitors WSNs 104 in the local railcar-based mesh network 105.

A powered wireless gateway ("PWG"), shown in the drawings as reference number 102 (see, e.g., FIG. 2), is preferably located on a locomotive 108 or elsewhere on a train consist 109 where there is a source of external power. It typically will include a processor; a GPS receiver; one or more sensors, including, but not limited to, an accelerometer 404, gyroscope, or temperature sensor 406; a satellite and or cellular communication system; local wireless transceiver (e.g. WiFi); an Ethernet port; a high capacity mesh network manager and other means of communication. The PWG 102 will have power supplied by the locomotive 108, if located on a powered asset, such as a locomotive 108, or will derive its power from another source, for example, from a solar power generator or from a high-capacity battery. The PWG 102 controls a train-based mesh network 107 overlaid on a train consist 109, consisting of multiple CMUs 101 from each railcar 103 in a train consist 109.

The components and configuration of the PWG 102 are similar to that of a CMU 101, with the exception that the PWG 102 typically draws power from an external source, while the CMU 101 is self-powered. Additionally, the PWG 102 collects data and draws inferences regarding the performance of the train consist 109, and train-based mesh network 107, as opposed to CMUs 101, which draw inferences regarding the performance of individual railcars 103 and railcar-based mesh network 105 or 118.

A railcar-based mesh network shown in the drawings as reference number 105, see, e.g., FIGS. 1 and 2, consists of a CMU 101 on a railcar 103, which is part of and manages a railcar-based mesh network 105 of a plurality of WSNs 104, each deployed, preferably on the same railcar 103.

A wireless sensor node ("WSN"), shown in the drawings as reference number 104, see, e.g., FIGS. 1 and 2, is located on a railcar 103, and provides the functions of collecting data from internal sensors and analyzing the data collected from the sensors to determine if the data needs to be transmitted immediately, held for later transmission, or aggregated into an event or alert. The WSN 104 is used for sensing a parameter to be monitored (e.g. temperature of bearings or ambient air) or status (e.g., position of a hatch or hand brake). In a preferred embodiment, each WSN 104 is equipped with one or more accelerometers or gyroscopes and one or more temperature sensors. Examples of WSNs 104 are disclosed in published U.S. patent application 2013/0342362, the disclosure of which is hereby incorporated by reference herein. A typical WSN 104 is shown in exploded view in FIG. 4 and FIG. 5 and will now be explained in more detail.

Figure 4:
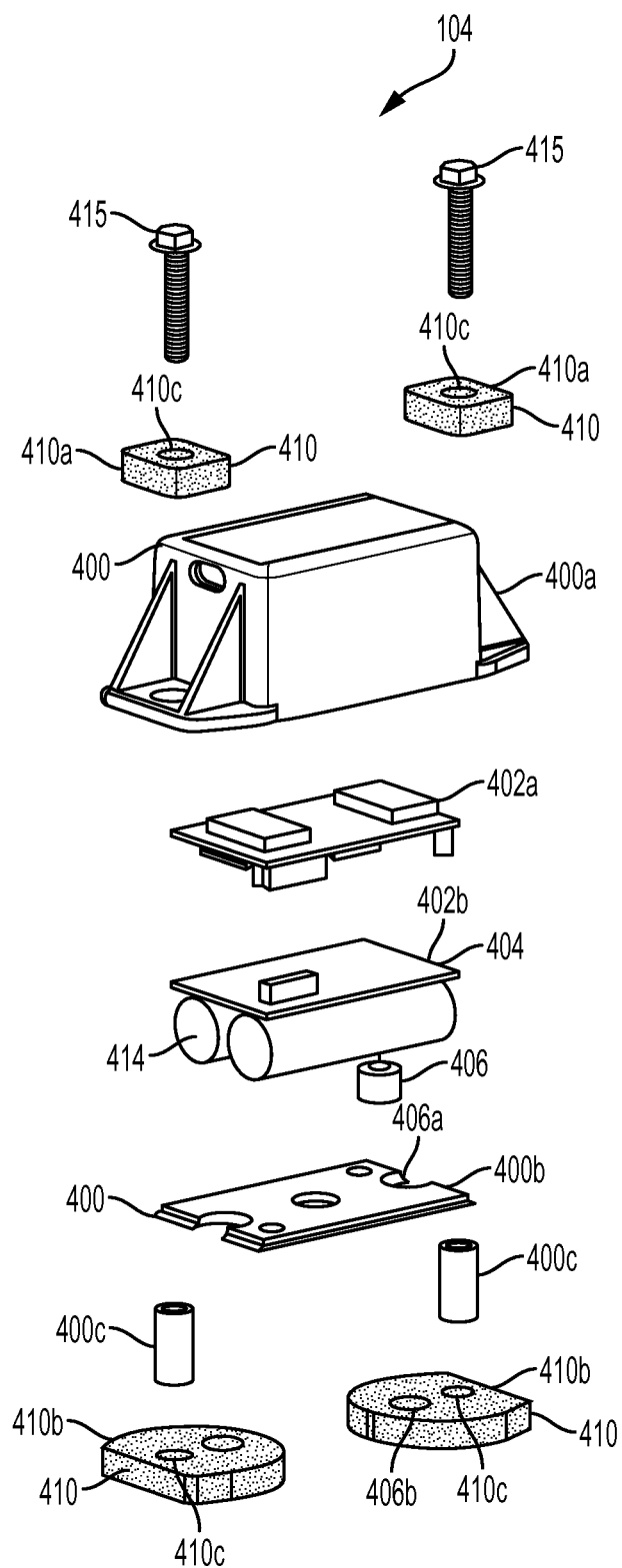
FIG. 4 is an exploded view of a first variety of WSN 104 which can be used, for example, for monitoring bearing temperature and wheel acceleration.

With reference to FIG. 4, an example of a first variety of WSN 104 is now described. The WSN 104 shown in FIG. 4 is configured and tuned to detect certain kinds of acceleration and temperature events and is typically located on the wheel bearing fitting 111 of railcar 103, where it is likely to be subjected to various degrees of accelerations and where it can easily collect data regarding the temperature of the wheel bearing. The components of WSN 104 are contained in a housing 400 having an enclosure 400a and an enclosure base 400b. Preferably, housing sections 400a, 400b are composed of a hard plastic resistant to environmental damage, such as a UV rated polymer, e.g., a polycarbonate/ABS blend, and when fully assembled is weatherproof. After the various components are installed within the housing as described below, a potting material (not shown) is provided through openings in the housing 400 to isolate, encapsulate and environmentally seal the components within. Such materials include epoxies, polyurethanes and silicone compounds. A flexible urethane suitable for electrical use and through which wireless signals can be transmitted is preferred. It has been found that the particular potting material used is also critical in the proper tuning of the WSN 104 to detect various types of accelerations. A potting material having a durometer of 59 Shore 00 is preferred.

Additionally, a mechanical filter 410 consisting of upper sections 410a and lower sections 410b further serve to mechanically filter high and low frequency types of accelerations that are considered noise and which are preferably removed from the signal of interest. Preferably, these components are composed respectively of silicone of durometer 70 Shore A (the upper filter sections 410a) and 30 Shore A (the lower filter sections 410b) in view of the differences of the surface areas of each section and this affect on the filtering characteristics.

In a preferred embodiment, each WSN 104 may have one or more accelerometers 404 and one or more temperature sensors 406. The tuning of WSN 104 is accomplished by a combination of the selection of the potting material, the durometer of upper and lower silicone mechanical filtering elements 410a and 410b, and software filtering performed by software executing on a processor on main PC board 402a. The software filter used is a digital filter to decrease noise from unwanted acceleration frequencies and increase signals from acceleration frequencies of interest.

Temperature sensor 406, includes a heat transfer element which extends through an opening 406a in the enclosure base 400b, and opening 406b in the filter section 410b. Preferably, the heat transfer element is a copper plug. This configuration is preferred for monitoring the surface temperature of the surface to which WSN 104 is attached, as the heat transfer element will make contact with the surface. In preferred embodiments of the invention, the temperature sensor 406 is a thermistor, thermocouple or silicone temperature sensor which are ideal for electronic circuits. In this embodiment, WSN 104 will be mounted to place the heat transfer element in thermal communication with the portion of the railcar 103 for which a temperature reading is desired. Additionally, the lower sections 410b of the mechanical filter are of a suitable thickness to create an air gap between the enclosure base 400b and the surface to which the WSN 104 is mounted. The lower sections 410b of the mechanical filter and the air gap create good thermal protection and low heat transfer from the surface to which the WSN 104 is mounted. This thermal protection keeps the electronics (all except for the temperature sensor 406) and the power source from being exposed to excess and potentially damaging heat. WSN 104 may also be equipped with additional temperature sensors (not shown) for sensing the ambient temperature.

In the preferred embodiment, self-taping screws 415 serve to attach WSN 104 to the railcar 103 and to hold upper and lower portion 410a and 410b of mechanical filter in place. Spacers 400c which fit within the screw openings 410c of the filter pads are chosen in length to control the amount of compression force on the filter sections 410a and 410b due to the tightening of the screws 415. Without the spacers 400c, the filtering characteristics of the filters could be changed due to compression from over tightening of the screws 415. The spacers are chosen from a suitably stiff material.

As one of ordinary skill would recognize, the configuration of WSNs 104 may vary with respect to the number and types of sensors. Virtually any type of sensor could be used, including, for example, a temperature sensor 406, a pressure sensor, a load cell, a strain gauge, a hall effect sensor, a vibration sensor, an accelerometer 404, a gyroscope, a displacement sensor, an inductive sensor, a piezio resistive microphone or an ultrasonic sensor, depending on the specific operational parameter that is desired to be monitored. In addition, the sensor may be a type of switch, including, for example, reed switches and limit switches. An example of another type of mote sensor which uses a strain gauge, e.g. a hand brake monitor sensor, is described in U.S. patent publication 2012/0046811 (U.S. patent application Ser. No. 12/861,713 filed Aug. 23, 2010), the disclosure of which is hereby incorporated herein by reference.

Electrical circuitry is provided for the operation of WSN 104. The electrical circuitry includes the components and wiring to operate and/or receive and process the signals from the sensors. This can include, but is not limited to, analog and digital circuitry, CPUs, processors, circuit boards, memory, firmware, controllers, and other electrical items, as required to operate the accelerometers and temperature sensors 406 and to process the information as further described below.

In the illustrated embodiment in FIG. 4, the circuitry includes a main board 402a which includes the communications circuitry, antennae and microprocessor and a daughter board 402b which includes circuitry to read the data from accelerometers 404 and temperature sensors 406. Main board 402a, daughter board 402b or the sensors may also include a processor executing firmware to provide intelligence sufficient to perform low-level analysis of the data, and may accept parameters from outside sources regarding when alarms should be raised, as described below.

Each WSN 104 also includes circuitry for wireless communications and a long-term power source 414 (e.g. a battery, solar cell, energy harvester, or internal power-generating capability), preferably a military grade lithium-thionyl chloride battery. The circuitry also provides power conditioning and management functions and may include a feature to conserve battery life which keeps WSN 104 in a standby state and periodically wakes WSN 104 to deliver readings from the sensors.

Figure 5:
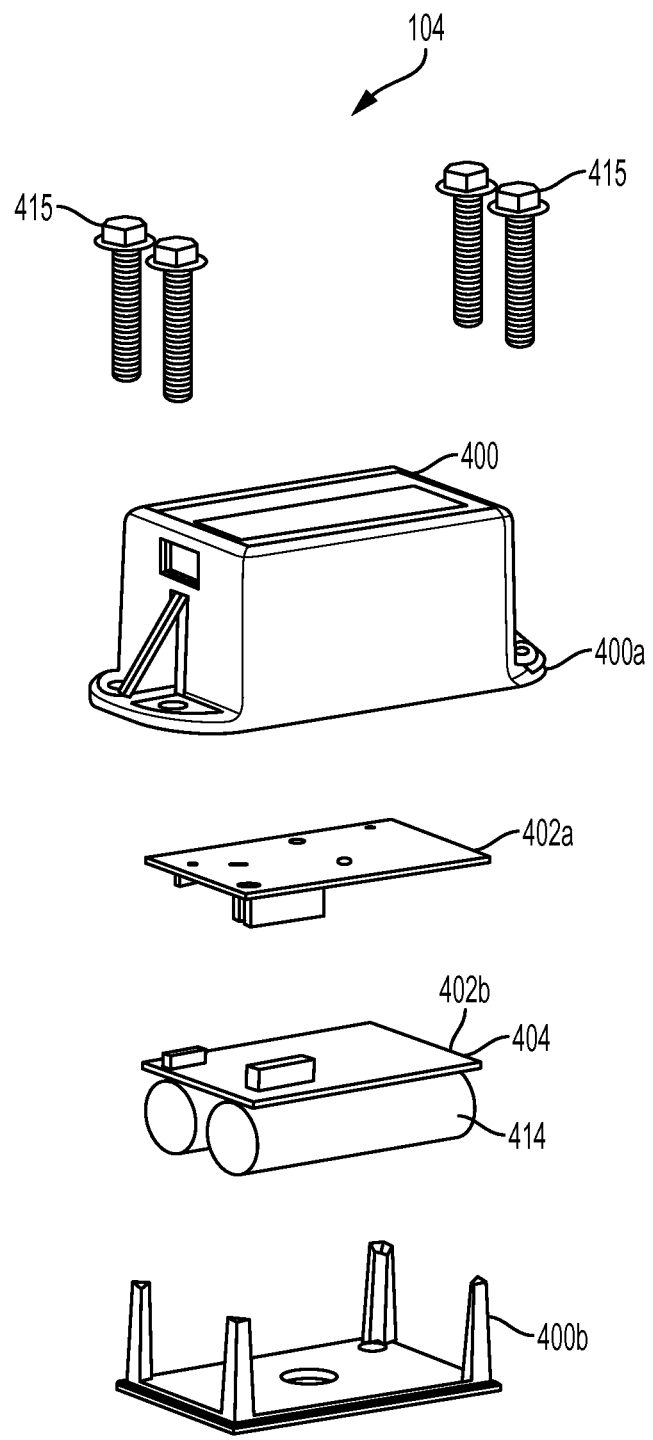
FIG. 5 is an exploded view of a second variety of WSN 104 which can be used, for example, for monitoring railcar body acceleration, and which can include a temperature sensor (not shown) for monitoring temperature.

FIG. 5 shows an exploded view of a second variety of WSN 104, which is preferably mounted on the body of railcar 103. The variety of WSN 104 shown in FIG. 5 is substantially identical to the variety shown in FIG. 4 (and thus similar elements are identified with the same reference number), with the following differences. First, as this variety of WSN 104 will be mounted to the body of railcar 103, where it is likely to be subjected to more gentle accelerations, there is no need for the additional mechanical filtering provided by mechanical filters 410 of FIG. 4. Thus, using four screws, two on each side, and given that this WSN is not exposed to the more violent accelerations of the other variety, the screws or bolts of this second variety can be smaller in diameter. Second, the illustrated embodiment does not include a temperature sensor 406, although one or more temperature sensors 406 may be provided with a heat transfer element, as discussed above for the first variety, extending through an opening in the housing to sense the desired temperature, e.g., the ambient temperature. Lastly, although this variety of WSN 104 includes an accelerometer 404 like the prior described WSN 104 of FIG. 4, it preferably will be programmed with different firmware to detect different types of acceleration events, as discussed below. As understood by one of ordinary skill, the WSNs of both varieties could also contain just a temperature sensor, although there would be no need for filtering as described with reference to FIG. 4.

Figure 6:
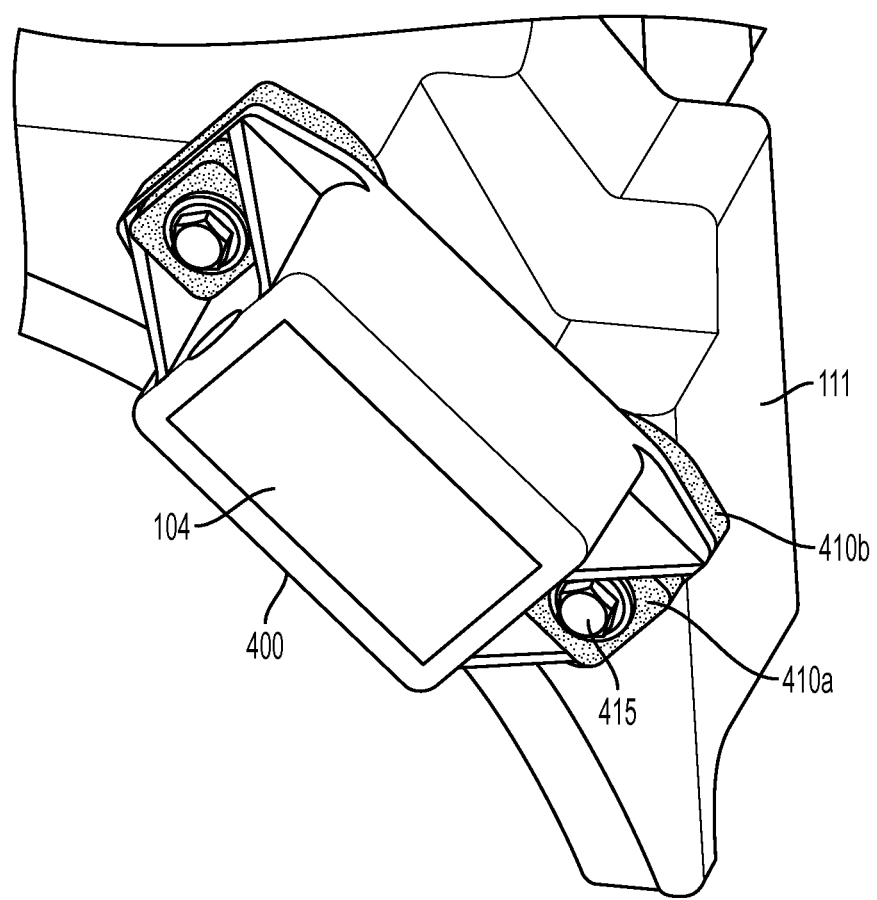
FIG. 6 shows the WSN 104 of FIG. 4 installed on a railcar wheel bearing fitting 111.

Individual WSNs 104 are mounted on the areas of interest on a railcar 103. As an example, FIG. 6 shows WSN 104 of the type shown in FIG. 4 mounted to a roller bearing fitting 111 of a railcar wheel bearing of a railcar 103. The unit may be attached using a thermally conductive epoxy adhesive between the heat transfer element and the roller bearing fitting 111 to ensure good heat transfer to the temperature sensor 406, and mechanical fasteners such as self-tapping screws 415 to hold WSN 104 in place.

System Operation

In broad terms, with reference to FIGS. 1 and 2, the present invention provides a novel means for monitoring the performance and operation of a railcar 103 and train consist 109. This includes a plurality of sensors 104 deployed on the railcars 103 in the consist 109 for sensing various operational parameters of the railcar 103 and distributed complex event processing (DCEP) engine, which is a hierarchical system for collecting and analyzing the data and for communicating data, events and alerts to a final destination where they can be acted upon.

The DCEP is responsible for implementing the intelligence used to draw conclusions based on the data collected from WSNs 104, CMUs 101 and PWGs 102. Preferably, the data processing platform is distributed among all WSNs 104, CMUs 101 and the PWG 102 on the locomotive 108, as well as utilizing a cloud-based infrastructure optimized to work closely with train-based mesh networks 107, in conjunction with a variety of data streams from third-party providers or external sources.

With further reference to FIG. 1 of the drawings, a railcar-based mesh network is shown generally as reference number 105. Railcar-based mesh network 105 comprises a CMU 101 installed on a railcar 103 and one or more WSNs 104 installed on the same railcar 103. Railcar 103 may consist of one or more individual railcars 103, which are permanently connected together. The railcar-based mesh network 105 is a critical component in the processing of events and alerts on the railcar 103. CMU 101 and WSNs 104 work together to collect and analyze the data collected from sensors in the WSNs 104. CMU 101 controls the railcar-based mesh network 105 on railcars 103 and is able to configure one or a more WSNs 104 in a local mesh network to transmit, listen, or sleep at precise times, or to change the parameters under which WSNs 104 operate and detect events.

With further reference to FIG. 2, a schematic of a train-based mesh network 107 is shown with two railcars 103 each equipped with a CMU 101 and multiple WSNs 104 installed near the wheel bearings of the railcar 103, a railcar 103 equipped with just a CMU 101 with no WSNs 104 attached, a railcar 103 without a CMU 101, and a PWG 102 installed on a locomotive 108. The CMU 101 and multiple WSNs 104 installed on railcars 103 form a railcar-based mesh network 105 and communicate with the PWG 102 on a host or control point, such as a locomotive 108 or other asset, forming the train-based mesh network 107. The railcar-based mesh network for the railcar 103 having a CMU 101 only and no WSNs is designated 118.

If an alert or event condition is detected by a WSN 104, as described in more detail below, a message is forwarded by WSN 104 to CMU 101 for further analysis and action, for example, to confirm or coordinate alert or event conditions reported by one WSN 104 with other WSNs 104 in the railcar-based mesh network 105. If an alert or event is confirmed by CMU 101, a message is sent to PWG 102 installed on an asset, preferably with access to a power source and/or to an off train monitoring and remote railroad operations center 120.

CMU 101 on each railcar 103 is capable of supporting an optional global navigation satellite system (GNSS) sensor to determine location, direction and/or speed of railcar 103. This information can be used to determine whether or not WSNs 104 should be looking for certain types of events. For example, it is fruitless for a WSN 104 to attempt to detect derailments when the train consist 109 is stationary. Additionally, the PWG 102 can send instructions for the CMU 101 to start or stop looking for certain types of events. Additionally, CMU 101 on each railcar 103 is capable of using built-in sensors and/or managing a railcar-based mesh network 105 on the railcar 103 to generate messages that need to be sent to a host or control point, such as a locomotive 108.

Alert and Event Detection and Reporting

Each WSN 104 is capable of analyzing the data collected from its sensors in determining if the an event or alert message, as well as the data should be uploaded to the next higher level in the hierarchy, in this case CMU 101. With respect to accelerometers 404, each WSN 104 can be programmed with multiple thresholds for peak and root mean square (RMS) level of magnitude values acceleration readings received from the one or more accelerometers 404. When one of the peak or RMS acceleration thresholds are exceeded, it is an indication of a possible event or alert condition, and a message is generated and sent to CMU 101 in the same railcar-based mesh network 105. The thresholds for each variety of WSN 104 may be dynamically programmed by commands either generated internally or received externally from CMU 101.

In the preferred embodiment, WSNs 104 are programmed with thresholds which indicate specific types of alerts or events. For the WSNs 104 mounted on wheel roller bearing fittings 111, these units may generate a possible derailment message, a vertical impact message or a wheel damage message depending upon the threshold which is exceeded. For WSNs 104 located on the body of railcar 103, examples of messages generated are longitudinal impact, extreme lateral railcar dynamics, extreme vertical railcar dynamics, vertical hunting and lateral hunting. In the illustrated embodiments, the WSNs 104 do not determine if each of the possible conditions actually exists. This determination is preferably made at the next level up of the hierarchy, at CMU 101, which utilizes the readings from multiple WSN 104 to make a determination that an actual event has occurred. As would be readily realized by one of skill in the art, different thresholds suggesting the occurrence of other types of events may be programmed into WSNs 104.

Regarding the temperature sensors 406 in each WSN 104, which are capable of sensing the temperature of the surface on which a WSN 104 is installed and/or the temperature of ambient air around the WSN 104, the temperature readings from each WSN are periodically reported to the CMU 101. The CMU 101 must coordinate the collecting of temperature data from all WSNs 104 in the railcar-based mesh network 105 and, as such, the period for reporting of temperatures, as well as the timing of the reporting of temperature data is programmed for each WSN 104 by CMU 101.

Each WSN 104 is able to make a determination of when to report data that may indicate a possible event or alarm condition to CMU 101. CMU 101 is able to collect such notifications from each WSN 104 under its control and coordinate the data to make a final determination as to whether or not an event or alarm condition actually exists. For example, in the preferred embodiment each wheel roller bearing fitting 111 in a railcar 103 will have a WSN 104 attached thereto to monitor accelerations and temperature. Thus, on a typical railcar 103 having two trucks (bogies), each with two axles, a total of eight WSNs 104 mounted to wheel roller bearing fitting 111 will be present. In addition, and also in accordance with a preferred embodiment, each railcar 103 will preferably have an additional WSN 104 located at each end of the railcar 103 attached directly to the railcar body. CMU 101 also may include acceleration, temperature or any other type of sensors and may replace one or more of the WSN 104s on the body of railcar 103 or may be supplemental to the set of WSN 104s that are installed on the body of railcar 103. The railcar-based mesh network 105 may include any combination of WSNs 104, including a configuration wherein the CMU 101 is the only component installed on the railcar 103. Additionally, CMU 101 may also monitor WSNs 104 installed on other railcars 103 such as in the case where railcar 103 may consist of one or more individual railcars 103 which are permanently connected together.

In the preferred embodiment, the logic in the CMU 101 is capable of analyzing both acceleration and temperature events received from each of the WSNs 104 under its control and determining if an alarm or event condition actually exists. It should be noted that acceleration events are independent of temperature events and the CMU 101 may be configured to either analyze only acceleration events, or to analyze only temperature events. Thus the CMU 101, and WSNs 104 under its control, form a distributed event processing engine which is capable of determining various types of events.

The acceleration events which CMU 101 is capable of detecting in the preferred embodiment will now be discussed in greater detail. It should be noted that when CMU 101 determines that an alarm or event has occurred, a message is sent to the next level in the hierarchy that is either to a PWG 102 located elsewhere on train consist 109 or off train consist 109 to a remote railroad operation center 120, depending upon the severity of the event and the need to immediately address the event, perhaps by altering the train consist's 109 operating condition. Examples of events that can be analyzed using the features described above are provided below.

Derailment—A derailment event is regarded as a high priority type of event and is an example of the type of events that can be analyzed by the illustrated embodiment. When a derail message is received from a WSN 104, the CMU 101 starts a derailment processing timer and also immediately generates a possible derailment message to the PWG 102. CMU 101 then waits to determine if any other WSNs 104 are generating derailment messages. If other WSNs 104 have generated derailment messages within a predetermined time interval, they are all presumed to have originated from the same physical event and a derailment message is generated and sent to PWG 102.

Figure 9:
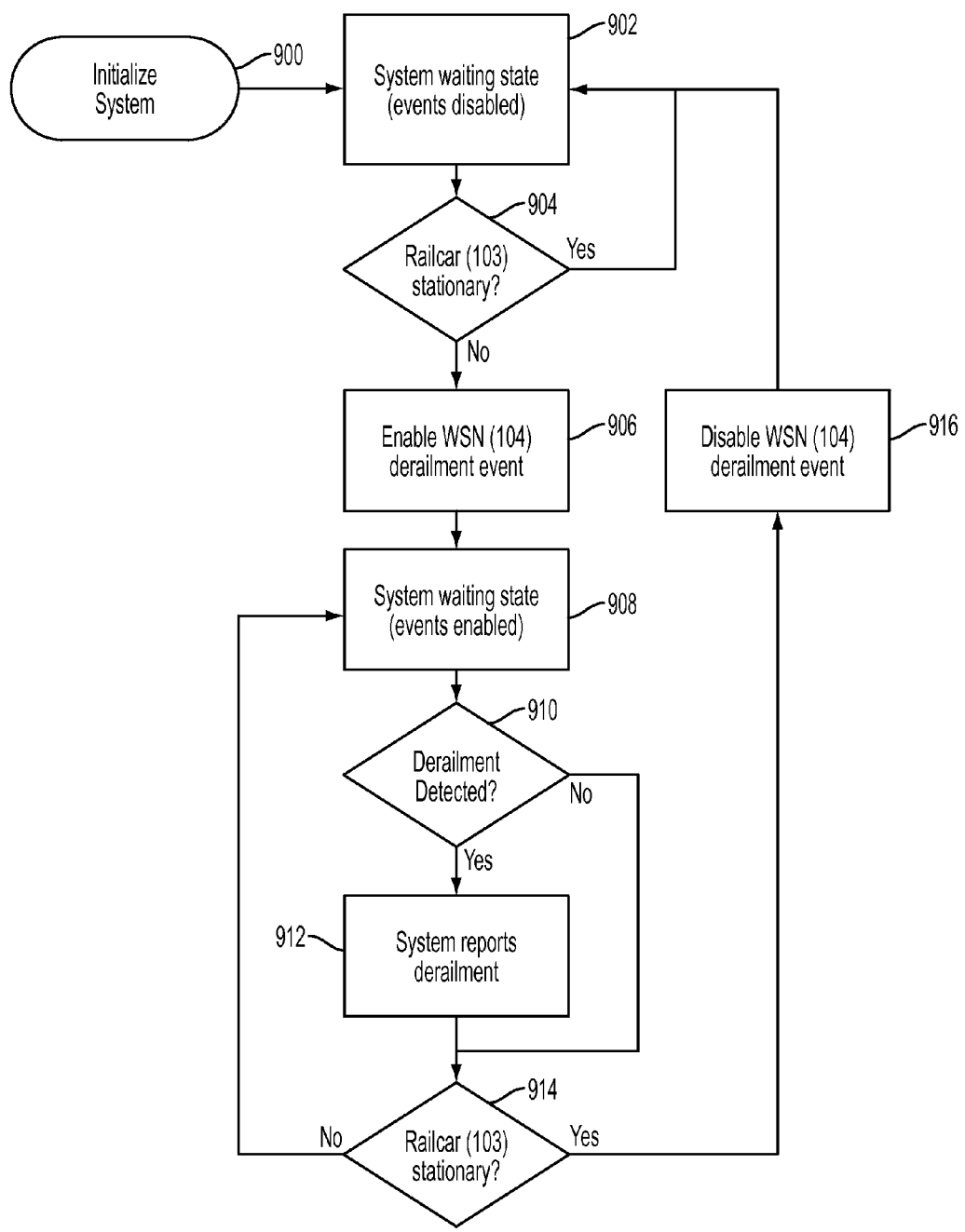
FIG. 9 is a flow chart showing the conditions under which derailment monitoring event processing is enable and disabled.

FIG. 9 is a flow chart showing the conditions under which the derailment event is enabled or disabled. At 900, the system is initialized and, at 902, the system is placed in a waiting state in anticipation of the railcar 103 moving, wherein the derail event is disabled. It should be noted that derailment events are disabled when the railcar 103 is stationary. At 904, the system checks to see if the railcar 103 is stationary and, if it is, it returns to the waiting state at 902. If the railcar 103 is moving control moves to 906 where the derailment event is enabled. The derailment event is enabled by having CMU 101 send a message to each of the WSNs 104 under its control. At 908, the system is again placed in a waiting state: however, the derailment event is now enabled. At 910, the system queries as to whether a derailment has been detected and, if not, control proceeds to 914 where the system queries as to whether the railcar 103 is stationary. If the railcar 103 is moving, control returns to 908, the system waiting state, having the derailment event enabled. If at 910 a derailment is detected, control proceeds to 912 where a system report of a derailment is made and control then proceeds to 914 as before. If, at 914, it is determined that the railcar 103 is again stationary, the derailment event is disabled at 916 and control returns to 902, where the system waits in a state where the derailment event is disabled.

Vertical Impact—A vertical impact message is regarded as a medium priority type of event. When a vertical impact event is received from a WSN 104, CMU 101 starts a vertical impact processing timer during which CMU 101 waits to see if any other vertical impact events are received from other WSN 104s. Depending on which side of the railcar 103 vertical impact messages are being generated, it can be determined, for example, that a broken rail or other track condition may exist.

Wheel Damage—A wheel damage message is regarded as a low priority type of event. When a wheel damage event is received from a WSN 104, CMU 101 starts to listen for additional wheel damage events from the same WSN 104. Thus, if CMU 101 receives multiple wheel damage messages from the same WSN 104, it can generate a wheel damage message. In such cases, CMU 101 may instruct WSN 104 to stop looking for wheel damage events as these will likely continue to recur and generate a barrage of messages from WSN 104 to CMU 101. In addition, the WSN 104 will have a counter to determine if it is sending wheel damage messages to the CMU 101 at a certain rate. If that rate is exceeded, the WSN 104 stops checking for wheel damage messages for a certain time period. After the time period has expired, the WSN 104 will check to see if the rate of wheel damage messages are still too high to send to the CMU 101.

Figure 10:
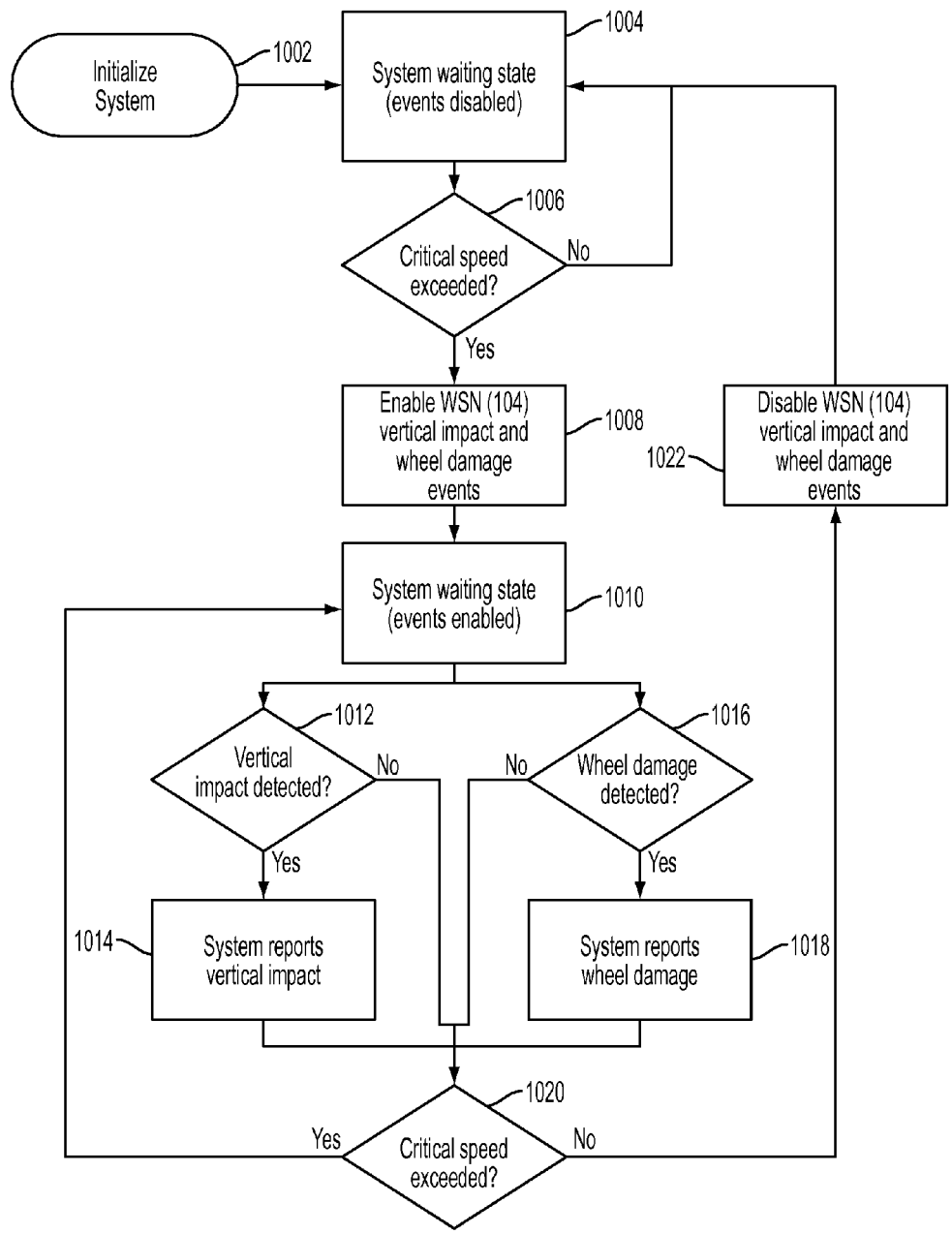
FIG. 10 is a flow chart showing the conditions under which wheel damage or vertical impact event processing is enabled and disabled.

FIG. 10 is a flow chart showing the conditions under which the wheel damage and vertical impact events are enabled or disabled. At 1002, the system is initialized and, at 1004, the system is placed in a waiting state wherein the events are disabled, as the critical speed required for event enablement has not yet been reached. Wheel damage and vertical impact events are only enabled when railcar 103 has reached a specific critical speed. Note that the speed of railcar 103 can be determined by several means, one preferred way is for a message to be sent from PWG 102 to all CMUs 101 in train consist 109. At 1006, the system checks to see if the critical speed has been reached or exceeded. The critical speed is a configurable setting of the system, typically set by each individual user, based on track and operational conditions, and is used to identify that the train is moving at a speed when such data is relevant. If not, control returns to 1004 where the system is again placed in a waiting state with the events disabled. If, at 1006, the critical speed has been reached or exceeded, control proceeds to 1008 where both the vertical impact and wheel damage events are enabled. Control then proceeds to 1010, where the system is placed in a waiting state having both types of events enabled. At 1012, if a vertical impact event has been detected, control proceeds to 1014 where the system reports the vertical impact. At 1016, the system checks to see if a wheel damage event has been detected and, if so, reports the wheel damage at 1018. In any event, control then proceeds to 1020, where the system checks to see if the railcar 103 is still at the critical speed necessary for the enablement of events. If it is, the system proceeds back to 1010 where the system is placed in a waiting state with events enabled. If the speed of railcar 103 has fallen below the critical speed, control proceeds to 1022 where both the vertical impact and wheel damage events are disabled, and then to 1004 where the system is placed in a waiting state with events disabled.

The proceeding acceleration events are all events which are detected by the variety of WSN 104 which is attached to the wheel roller bearing fitting 111 on railcar 103. The following events are all generated by the variety of WSN 104 which is attached to the body of railcar 103.

Longitudinal Impact—A longitudinal impact occurs when an acceleration is detected along the length of railcar 103, and is regarded as a medium priority type of event. When a longitudinal impact message is received from a WSN 104, the CMU 101 starts a timer during which it looks for other longitudinal impact events from other WSNs 104. Longitudinal impact events are likely to occur, for example, during the coupling process and when the train consist 109 starts and stops. CMU 101 may coordinate with other CMUs 101 on other railcars 103 to determine if longitudinal impact events which are generated on each railcar 103 originate from the same physical event.

Figure 7:
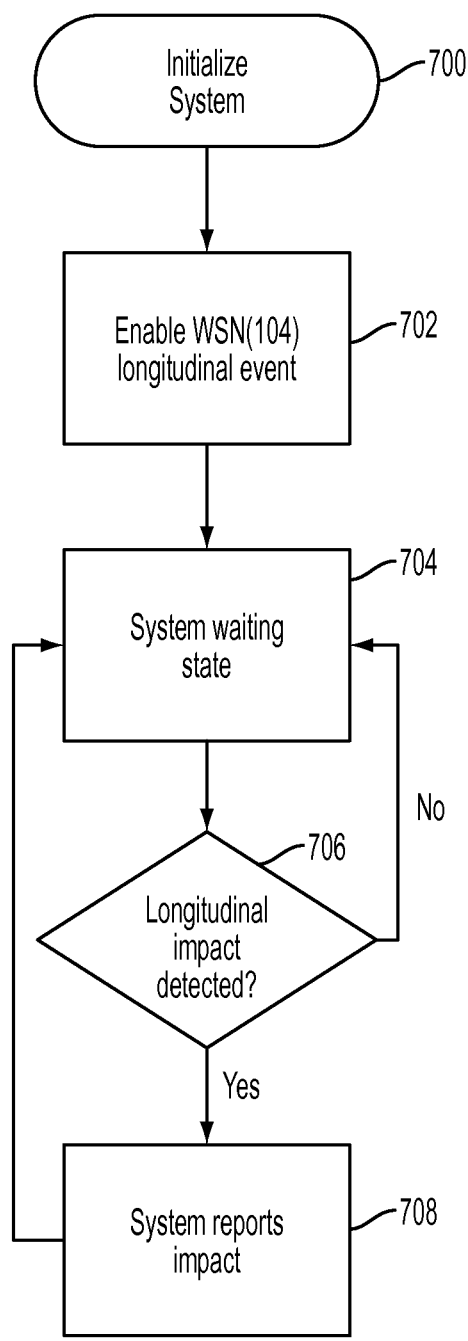
FIG. 7 is a flow chart showing the conditions under which longitudinal impact acceleration event processing is enabled and disabled.

FIG. 7 is a flow chart showing the conditions under which longitudinal events are enabled. At 700, the system is initialized and at 702 the longitudinal events are enabled. The control then proceeds to 704 where the system is placed in a wait state with the events enabled and enters a detection loop. At 706 the system determines whether a longitudinal impact has been occurred and, if not, returns to 704 where the system again enters the wait state. At 706, if a longitudinal impact has been detected, control transfers to 708 where the system generates and reports a message regarding the impact. Control then returns to 704 where the system again enters the wait state.

Vertical Extreme Vehicle Dynamics—A vertical extreme vehicle dynamics event occurs when an acceleration is detected in the vertical direction of railcar 103, and is regarded as a medium priority type of event. An event is detected by a peak acceleration threshold being exceeded by an acceleration along the vertical axis. When a vertical extreme vehicle dynamics message is received from a WSN 104, the CMU 101 starts a timer during which it looks for other vertical extreme vehicle dynamics events from other WSNs 104. Vertical extreme vehicle dynamics events are likely to occur, for example, from a subsidence in the track or change in track modulus at a bridge abutment. CMU 101 may coordinate with other CMUs 101 on other railcars 103 to determine if vertical extreme vehicle dynamics events which are generated on each railcar 103 originate from the same physical event.

Lateral Extreme Vehicle Dynamics—A lateral extreme vehicle dynamics event occurs when an acceleration is detected in the lateral, or cross line, direction of railcar 103, and is regarded as a medium priority type of event. An event is detected by a peak acceleration threshold being exceeded by an acceleration along the lateral axis. When a lateral extreme vehicle dynamics message is received from a WSN 104, the CMU 101 starts a timer during which it looks for other lateral extreme vehicle dynamics events from other WSNs 104. Lateral extreme vehicle dynamics events are likely to occur, for example, from a subsidence in the track or change in track modulus at a bridge abutment. CMU 101 may coordinate with other CMUs 101 on other railcars 103 to determine if lateral extreme vehicle dynamics events which are generated on each railcar 103 originate from the same physical event.

Vertical Hunting—Vertical hunting is a condition that can last a long time with certain dynamic conditions such as track corrugation. The WSN 104s located on each end of the railcar 103 body are commanded to periodically check for vertical hunting simultaneously, which allows a phase comparison of the readings from each WSN 104. When CMU 101 receives a vertical hunting message, a vertical hunting processing timer is started and CMU 101 waits to see if another WSN 104 has reported a vertical hunting event during a predetermined time interval. If multiple events are received within the time interval, CMU 101 examines the messages received and if the data indicates similar periodic oscillations at each end of the railcar 103, then the phase relationship between events occurring at each end of the railcar 103 is determined. For an in phase oscillation, the CMU 101 generates a railcar "body bounce" event. When the data indicates out of phase oscillation, CMU 101 generates a railcar "body pitch" event. In both cases the vertical hunting message is reported by CMU 101.

Lateral Hunting—Lateral hunting is a condition that can last a long time with certain dynamic conditions. Factors that contribute to lateral hunting include: high center of gravity railcars 103, worn trucks (bogies), and worn tangent track. The lateral hunting event detection works in a fashion similar to the detection of the vertical hunting events. When CMU 101 receives a lateral hunting event from one of the WSNs 104s on one end of the railcar 103 (e.g., the front end), a timer is started and, if another event is received from another WSN 104 on the other end of the same railcar (e.g., the back end) within a predetermined period of time then the events are compared for their phase relationship. If the data indicates an out of phase oscillation, then a "body yaw" event is generated. However, if the data indicates an in phase oscillation a "body roll" event is generated. In either case, a lateral hunting message is reported by CMU 101.

Figure 8:
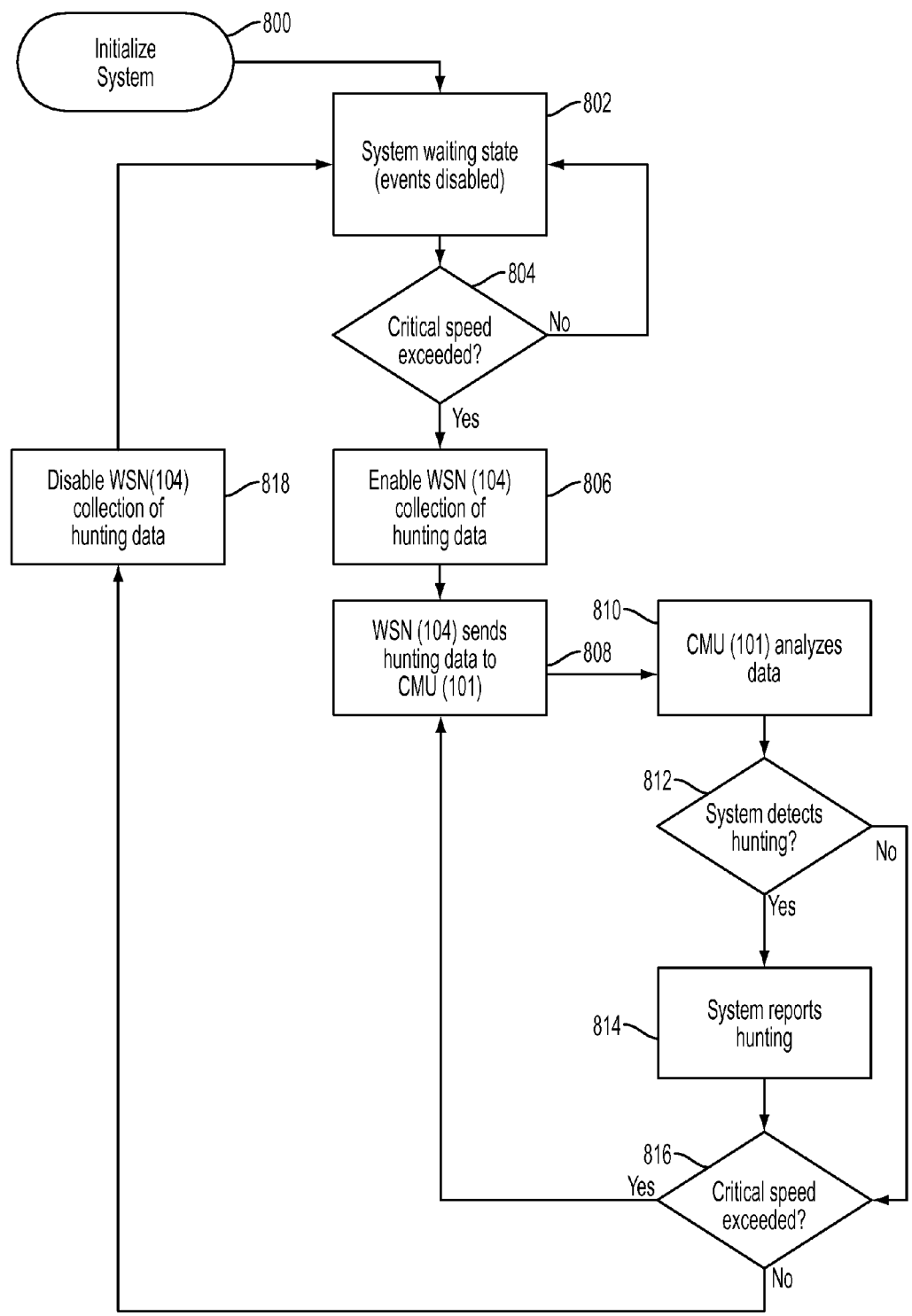
FIG. 8 is a flow chart showing the conditions under which vertical and lateral hunting acceleration event processing is enabled and disabled.

FIG. 8 is a flow chart showing the enabling, disabling, and reporting of vertical and lateral hunting events. At 800, the system is initialized and, at 802, the system is placed in a waiting state with the events disabled. Events, in this case, are disabled when the speed of railcar 103 is below a critical speed. Vertical and lateral hunting events are only enabled when the speed of railcar 103 exceeds the critical speed. At 804, the system checks to see whether critical speed has been exceeded and, if not, returns to the system waiting state in 802. However, if the critical speed has been exceeded, at 806, the vertical and lateral hunting events are enabled and, at 808, the system enters a loop wherein the hunting data is sent to CMU 101 and then analyzed to see if a hunting event has occurred. At 810, CMU 101 analyzes the data and, at 812, determines whether or not a hunting event has been detected. If a hunting event has been detected, control proceeds to 814 where the event is reported. If no hunting event has been detected in 812, control proceeds directly to 816 where the system again checks to see if the speed of railcar 103 is over the critical speed. If the speed of railcar 103 is still high enough for hunting events to be enabled, control returns to 808 and the system again enters the loop. If the speed of railcar 103 has fallen below the critical speed, control proceeds to 818, where the hunting events are disabled, and then to 802, where the system is placed in the waiting state with events disabled.

Figure 12:
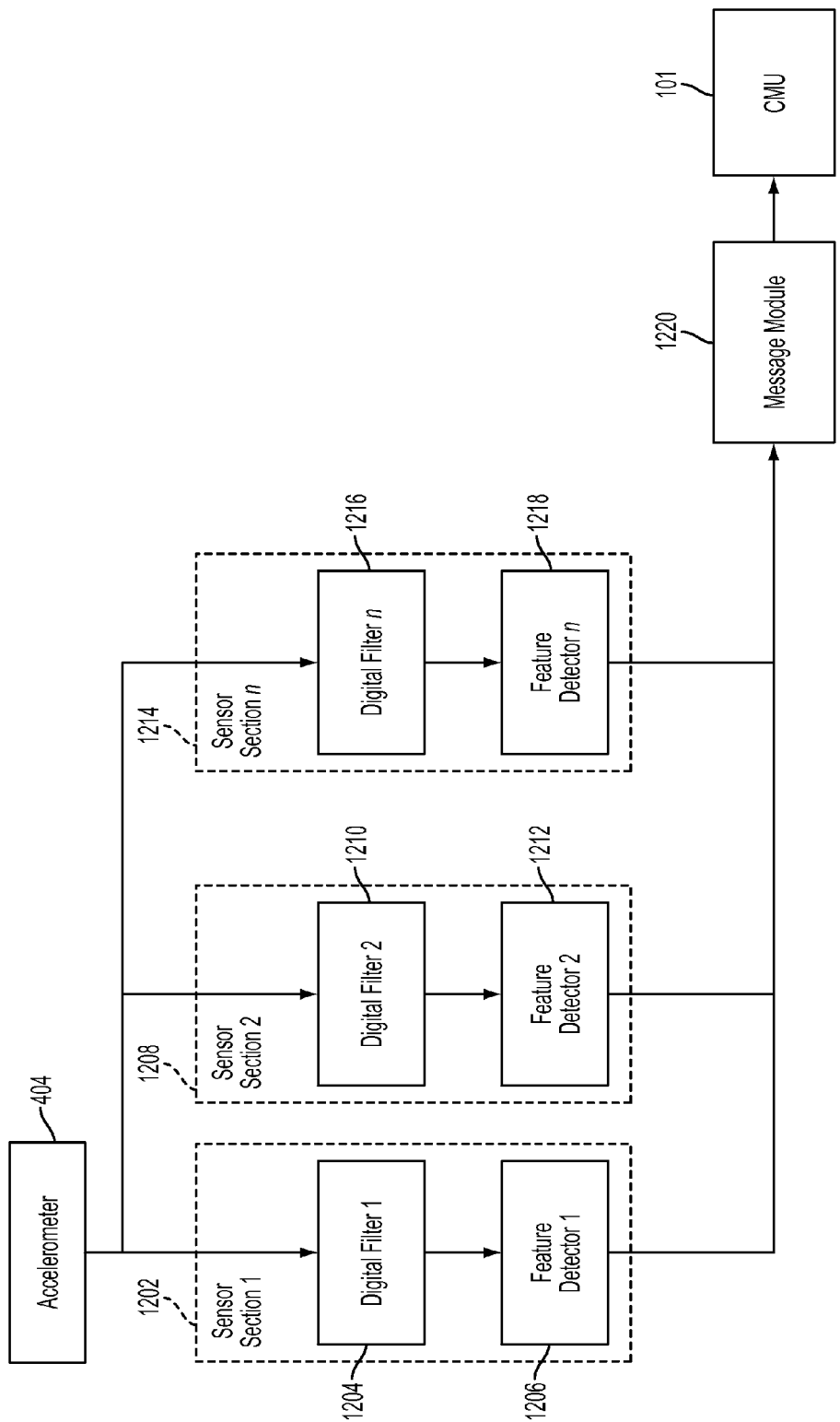
FIG. 12 is an architectural diagram showing a generalized model for implementation of the data analysis portion of a WSN 104.

With reference to FIGS. 4 and 12, a general implementation model of the analysis system of a WSN 104 is now described. As depicted in the preferred embodiment, the analyzed signal (what is not filtered out by the mechanical filter 410 or potting material), originates with accelerometer hardware 404 and is passed to one or more sensor sections 1202, 1208 or 1214. These sensor sections select the data to be analyzed using a digital data filter 1204, 1210 or 1216, and passes this data on to a feature detector 1206, 1212 or 1218. Data selection can be based on, for example, direction (e.g. vertical or longitudinal components), frequency (e.g. high-frequency clangs or low frequency rocking), overall magnitude (combination of 2 or 3 directional components), or other variations of the collected data.

The feature detectors may use a variety of techniques to determine if specific features are present. Features may include but are not limited to, pulse peaks or duration, root mean square (RMS) level of magnitude values, or presence or lack of specific frequency components. Once a feature is detected, a message is passed on to message module 1220 to be delivered to the CMU 101. The sensor section may also perform periodic tests to determine if the feature is still present. If it is, the section can also determine if continued messages should be sent or if a message should be sent only when the feature is no longer present.

Figure 13:
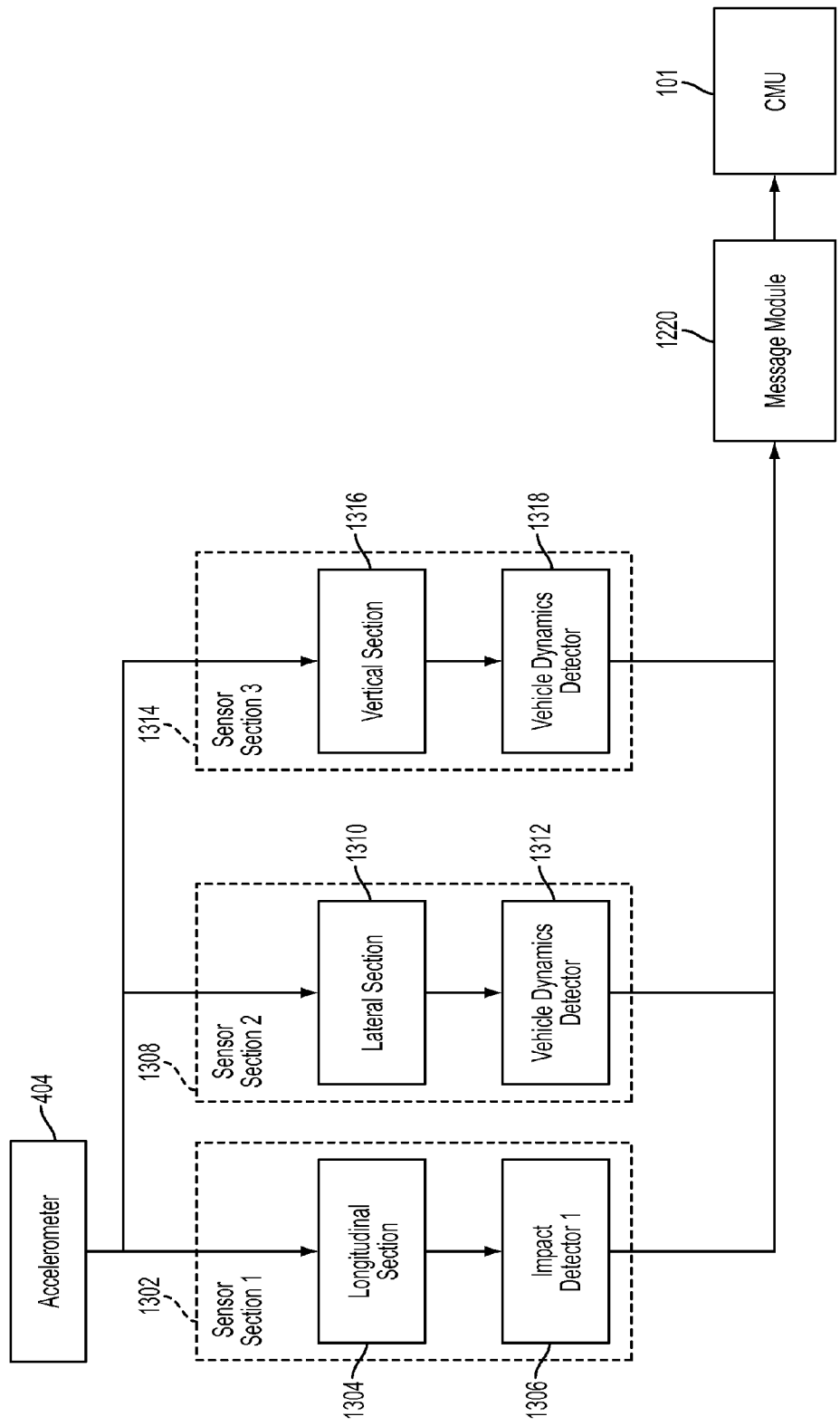
FIG. 13 is a specific implementation of the model shown in FIG. 12 directed to detection of railcar body events.

One possible implementation of the analysis system of FIG. 12 is shown in FIG. 13. Here, accelerometer 404 passes data on to three sensor sections. The first section 1302 selects data from the longitudinal direction down the length of the railcar 103 and uses Longitudinal Section 1304 to extract longitudinal impact data. Longitudinal impacts are detected in Impact Detector 1306 when the peak value of the longitudinal data exceeds a longitudinal impact threshold. The second section 1308 selects data from the lateral direction across the railcar 103 and uses Lateral Section 1310 to extract lateral oscillation data. Lateral oscillations are detected in Vehicle Dynamics Detector 1312 when the RMS value of the oscillations exceeds a lateral oscillation threshold. The third section 1314 selects data from the vertical direction and uses Vertical Section 1316 to extract vertical oscillation data. Vertical oscillations are detected in Vehicle Dynamics Detector 1318 when the RMS value of the oscillations exceeds a vertical oscillation threshold. Each of these sensor sections sends its messages on to message module 1220 which, in turn, passes these messages on to the CMU 101.

Figure 14:
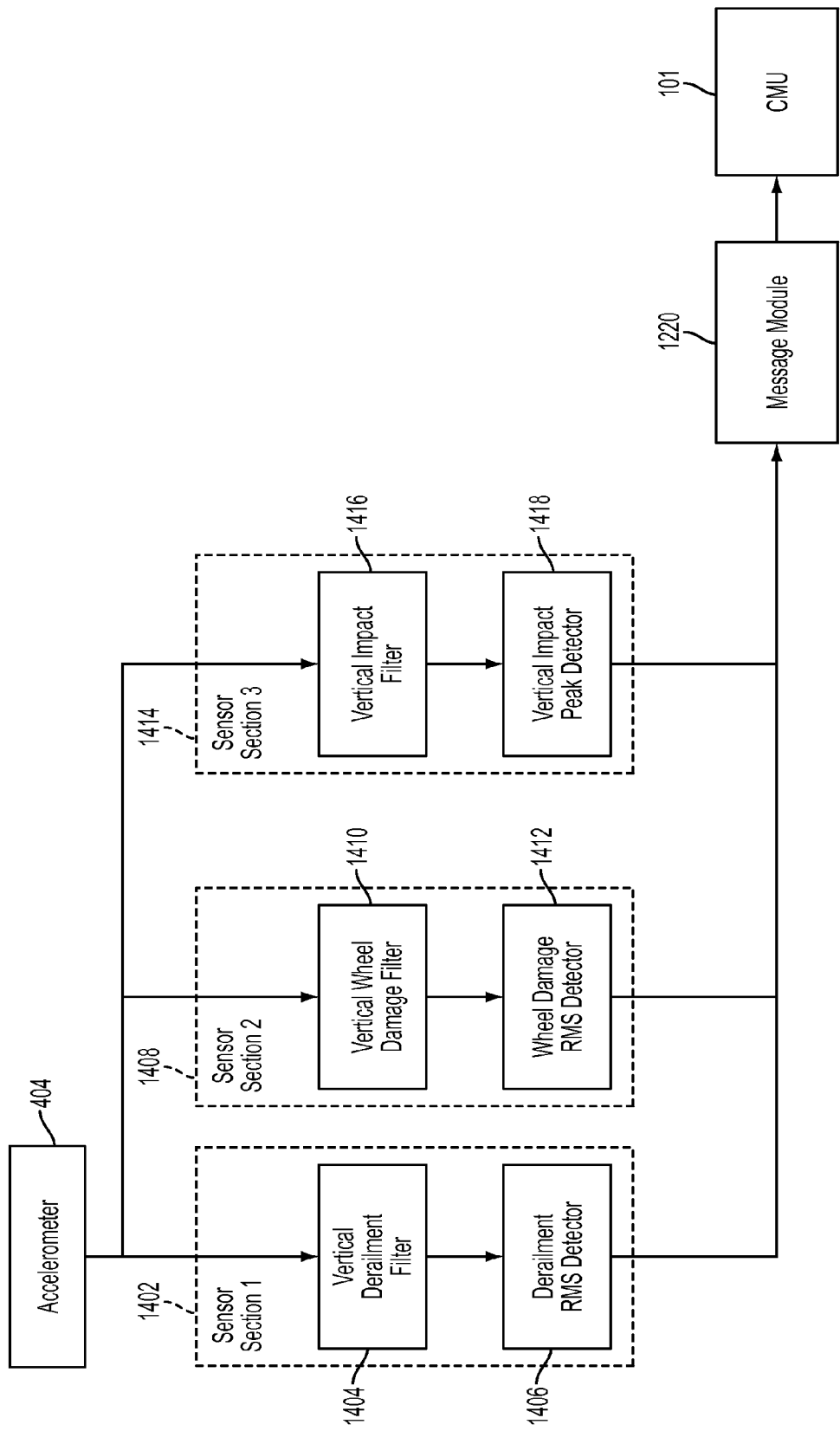
FIG. 14 is another specific implementation of the model shown in FIG. 12, this one directed to detection of wheel bearing events.

Another possible implementation of the analysis system is shown in FIG. 14. Here, accelerometer 404 passes data on to three sensor sections. The first section 1402 looks at data from the vertical direction and uses Vertical Derailment Filter 1404 to extract the characteristic frequencies of a derailment. Derailment events are detected in Derailment RMS Detector 1406 when the RMS value of the filtered data exceeds a derailment threshold. The second section 1408 also selects data from the vertical direction, but uses Vertical Wheel Damage Filter 1410 to extract the characteristic frequencies of wheel damage. Wheel damage is detected in Wheel Damage RMS Detector 1412 when the RMS value of the filtered data exceeds a wheel damage threshold. The third section 1414 also selects data from the vertical direction and uses Vertical Impact Filter 1416 to extract vertical impact data. Vertical impacts are detected in Vertical Impact Peak Detector 1418 when the peak value of the filtered data exceeds a vertical impact threshold. Each of these sensor sections sends its messages on to message module 1220 which, in turn, passes these messages on to the CMU 101.

When a derailment occurs, the wheels of one or more axles fall off the rails and run along the track bed. The rough nature of the track bed causes the derailed wheels to experience high-energy vertical accelerations for the duration of the derailment. In a preferred embodiment, a derailment is readily identified by calculating the RMS value of a series of consecutive vertical acceleration measurements and comparing the result with a threshold. If the CMU sees such data from the WSNs on both sides of the same axle, this could indicate a derailment. On the other hand, acceleration data from a single WSN regarding just one wheel processed through sensor section 1408 is more likely to indicate a damaged wheel.

CMU 101 also collects temperature data from each WSN 104. The collection of temperature data from each WSN 104 must be synchronized to avoid conflicts between WSNs 104 while transmitting the data to CMU 101, and to allow timely comparison and coordination of the temperature data from the readings from WSNs 104. This is achieved by storing the temperature data in a rotating buffer organized as one data set comprising one reading from each WSN 104 temperature sensor 406. In the preferred embodiment, each WSN 104 samples its temperature sensors 406 once per minute, four consecutive samples are averaged once every 4 minutes. The WSN 104 then sends a message containing 8 consecutive sample averages to the CMU 101 once every 32 minutes. CMU 101 keeps twenty samples in its rotating buffer for each temperature sensor 406, however, one of skill in the art would realize that other sampling intervals and buffer sizes could be used. It should be noted that WSNs 104 may have more than one temperature sensor 406. After each temperature message is received, the oldest set of data in the rotating buffer is discarded. When the data set is complete, the temperature data is examined for any significant temperature trends or events and then cleared so that the temperature data is used only once. As newer temperature messages are received, the buffer wraps around so that new data overwrites the oldest time slots. It should be noted that the WSNs 104 do not analyze the temperature data for specific events, but instead merely report it to the CMU 101. The CMU 101 examines the temperature data for trends and reports when certain thresholds have been detected. It should be noted that the temperature analysis is only performed when the train consist 109 is moving and is disabled when the train consist 109 is stationary. Therefore, WSNs 104 will not collect or report temperature data unless the train consist 109 is moving.

The following table is a listing of the alarms and warnings generated by the statistical analysis performed by the CMU 101 on the temperature data.

| | |
|---|---|
| Peak Analysis | Greater than x % of the temperature readings in the analysis statistics exceed the absolute temperature analysis threshold |
| Ambient Analysis | Greater than y % of temperature readings in the analysis statistics exceed the |

| | |
|---|---|
| Rate Analysis | above ambient temperature analysis threshold<br>z % of the operational time exhibits a temperature rise exceeding the temperature rate analysis threshold |

The variables x, y and z, in the above table indicate that these numbers are configurable depending on the preferences of the user or customer. As an example of a Peak Analysis operation, if x (as configured by the user, e.g., 20, 25 or 30) percentage of temperature readings on a bearing over a period of time exceed the absolute temperature analysis threshold, an alarm or warning may be sent. As an example of the usefulness of carrying out the different analyses, it is possible that the Ambient Analysis on a hot bearing, if the train is running in very hot weather conditions, might not indicate a problem when in fact there might be one, while the Peak Analysis which looks just at the bearing temperature will provide a warning or alarm. On the other hand, in very cold weather, the Peak Analysis may not indicate a problem with a hot bearing due to the cold weather cooling down the bearing, while the Ambient Analysis would. An example of Rate Analysis—when the railcar is not moving, a bad bearing will be at ambient temperature, but once the railcar starts moving, the bad bearing may heat up quicker than the other bearings on the railcar, and therefore will have a higher percentage of operational time it exceeds the threshold temperature rate.

As with acceleration events, WSNs 104 are also able to check for temperature events and report when the measured temperature exceeds certain thresholds. The table below lists these temperature-related alarms and events that can be provided immediately:

| | |
|---|---|
| Peak Alarm | Absolute temperature alarm threshold is exceeded |
| Peak Warning | Absolute temperature warning threshold is exceeded |
| Ambient Alarm | Temperature above ambient alarm threshold is exceeded |
| Ambient Warning | Temperature above ambient warning threshold is exceeded |
| Differential Alarm | Temperature difference alarm threshold is exceeded between bearings on the same axle |

The first four Alarms and Warnings in the above table are based on data preferably collected by individual WSNs and do not require any analysis other than the exceeding of a threshold and thus can be initiated by the WSN that collected the data. The last one, the Differential Alarm, requires data from at least two WSNs located on bearing fittings on opposite sides of an axle, and therefore the analysis and Alarm will preferably be carried out by the CMU.

Figure 11:
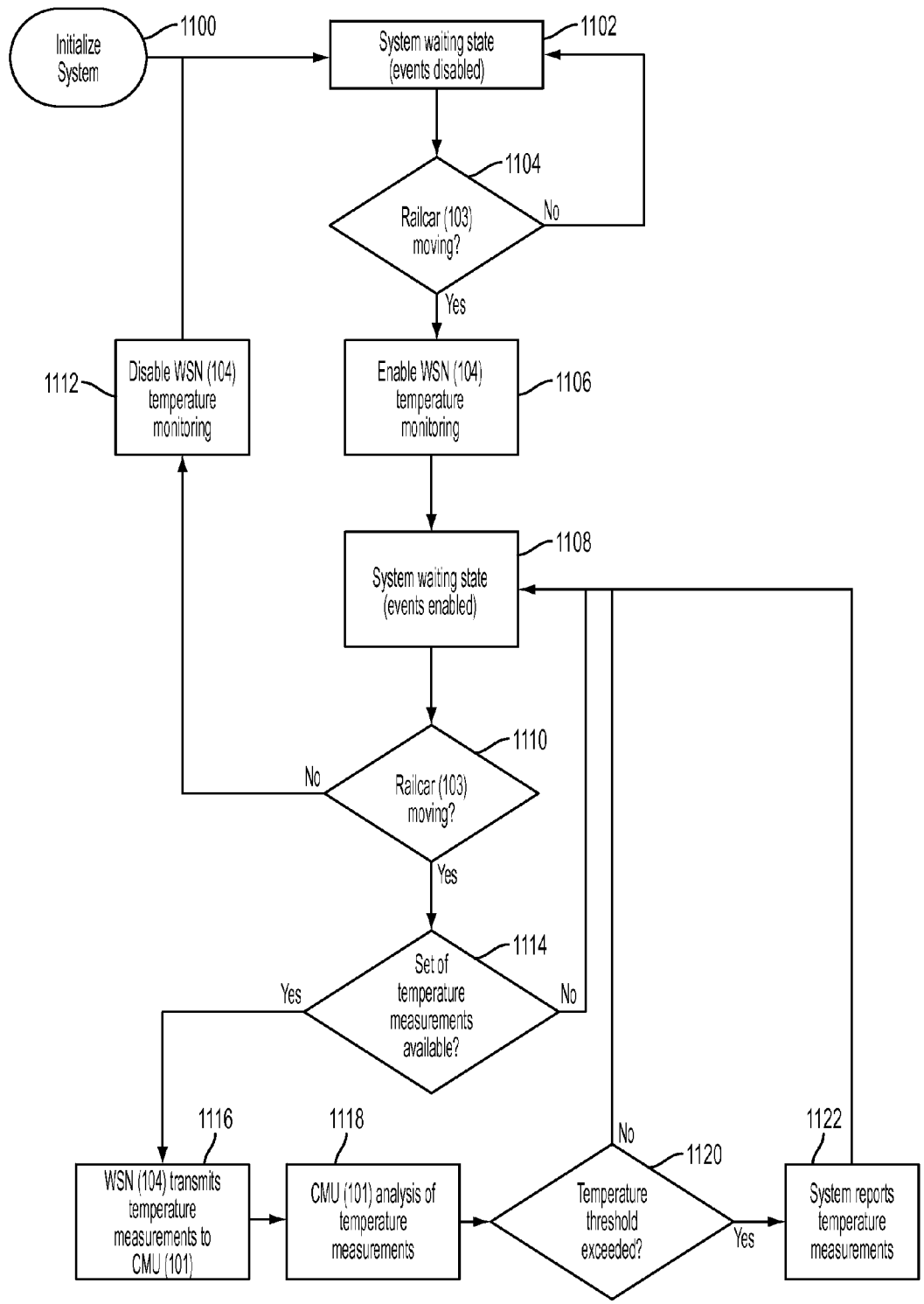
FIG. 11 is a flow chart showing the conditions under which bearing temperature event processing is enabled and disabled.

FIG. 11 is a flow chart showing the processing of events related to the measurement of temperatures of the wheel bearings of railcar 103. At 1100, the system is initialized and, at 1102, the system enters a waiting state wherein the temperature monitoring events are disabled. Events are disabled, in this case, when the railcar 103 is not moving. At 1104, the system checks to see if the railcar is moving and, if not, returns to 1002 where it again enters the waiting state with events disabled. If the railcar is moving, control proceeds to 1106 where the temperature monitoring events are enabled. The system then proceeds to 1108 where it enters a loop wherein events are checked. Control proceeds to 110 where the system again checks to see make sure the railcar 103 is moving. If the railcar 103 is not moving, control proceeds to 1112 where the temperature monitoring events are disabled and then back to 1102 where the system is placed in a waiting state with events disabled. If, at 1110, the railcar 103 is still moving, control proceeds to 1114 where the system checks to see if a set of temperature measurements are available. If not, control returns to 1108 where the system is in the waiting state with events enabled. If a set of temperature measurements is available in 1114, control proceeds to 1116 wherein the WSN 104 transmits the set of temperature measurements to CMU 101. At 1118, CMU 101 performs an analysis of the temperature measurements, including all those in the rotating buffer and, in at 1120, decides if a temperature threshold has been exceeded. If not, control returns to 1108 where the system is in a waiting state with events enabled. If a temperature threshold has been exceeded, the system reports the temperature measurements at 1122 and then returns to 1108 where it is again in the system waiting state with events enabled.

CMU 101 also detects long term trends and keeps data regarding trends in the analysis of bearing condition. The following statistics are collected for every bearing being monitored by a WSN 104 in the railcar-based mesh network 105:

1. Total number of valid temperature readings;
2. Stun of valid temperature readings;
3. Sum of valid temperature readings squared;
4. Number of temperature readings greater than the absolute temperature threshold;
5. Number of temperature readings greater than the above ambient temperature threshold; and
6. Number of temperature change rates greater than the heating rate threshold.

The bearing temperature statistics are accumulated on a daily basis in a rotating buffer that can hold thirty-two sets of data, thus allowing trend analysis over a thirty-day period. The DCEP engine controls the time that statistics are accumulated as a new set of statistics has begun and the oldest is discarded. Normally the event engine is configured to generate an analysis once per day.

The collected statistics may be used to calculate information that indicates bearing wear trends. In a preferred embodiment, a CMU 101 provides a report upon request of the following quantities for every wheel bearing:

a. Average bearing temperature;
    b. Variance of bearing temperature;
    c. Percentage of bearing temperature readings that exceed an absolute threshold;
    d. Percentage of bearing temperature readings above ambient that exceed a threshold; and
    e. Percentage of measurements that the rate of increase of bearing temperature exceeds a threshold.

Figure 3:
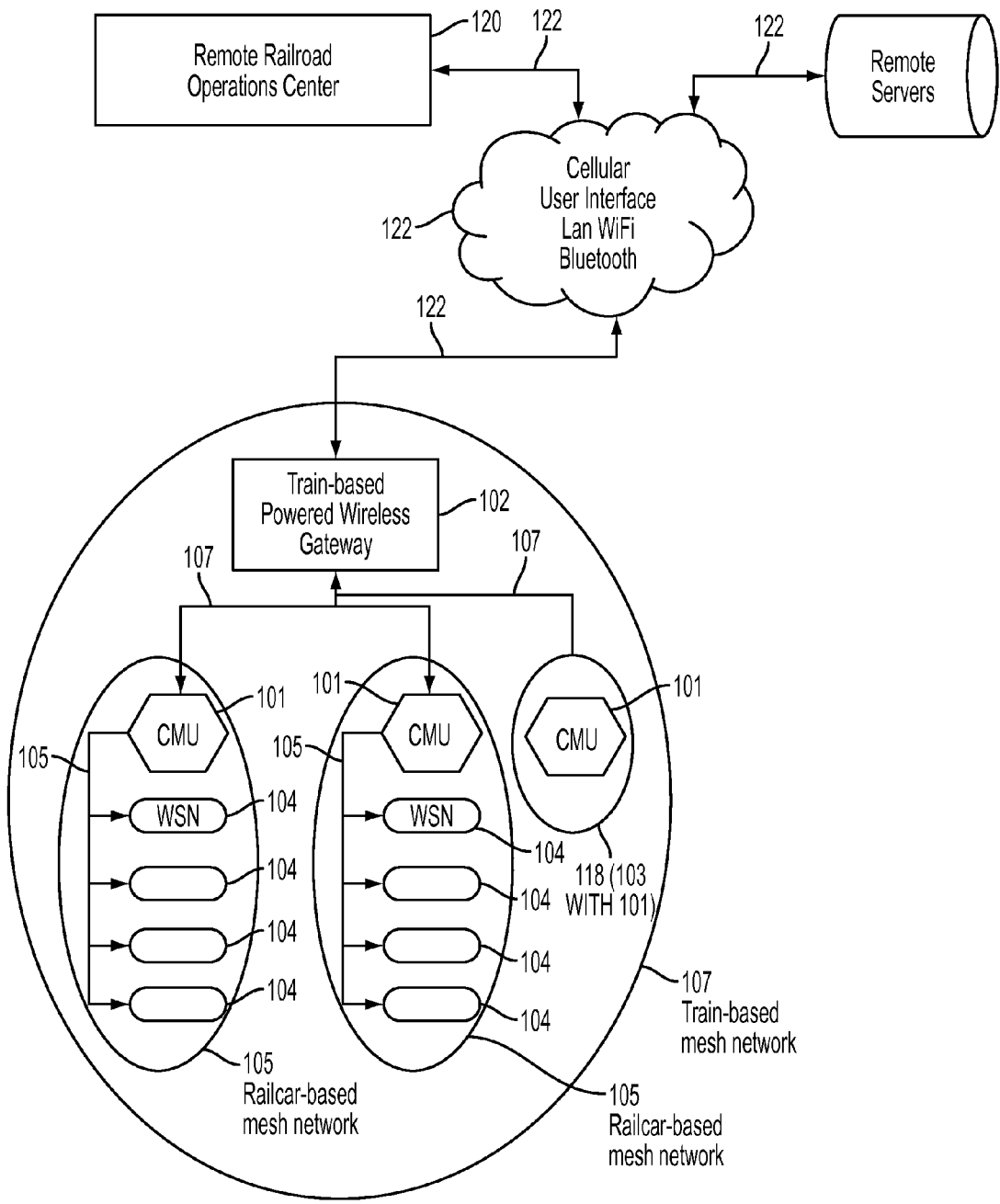
FIG. 3 shows a train-based mesh network 107 and various means of communicating data off-train.

A train-based mesh network is shown generally as reference number 107 in FIGS. 2 and 3. Train-based mesh network 107 is overlaid on a train consist 109 and includes a PWG 102 installed on a host or control point such as a locomotive 108, or on another asset with access to a power source, and one or more CMUs 101, each belonging to the train-based mesh network 107 and also to their respective railcar-based mesh networks 105, if one or more WSNs 104 are present, or respective railcar-based mesh networks or network 118 for railcars 103 with a CMU 101 but no WSNs 104 (see FIG. 2). (Note that there can also be railcars 103 in train consist 109 without a CMU 101 thereon, as shown by reference number 119 in FIG. 2). Thus, here, CMUs 101 can belong to two mesh networks, railcar-based mesh network 105 (if railcar 103 is fitted with one or more WSNs 104) and train-based mesh network 107. Each CMU 101 is also optionally managing its respective railcar-based mesh network 105. FIG. 3 shows a case wherein the train-based mesh network 107 consists of three CMUs 101, two of which are part of railcar-based mesh networks 105, and one located on a railcar 103 (reference number 118) wherein no WSNs 104 are connected.

Train-based mesh network 107 uses an overlay mesh network to support low-power bi-directional communication throughout train consist 109 and with PWG 102 installed on locomotive 108. The overlaid train-based mesh network 107 is composed of wireless transceivers embedded in the CMU 101 on each railcar 103. Each CMU 101 is capable of initiating a message on the train-based mesh network 107 or relaying a message from or to another CMU 101. The overlay train-based mesh network 107 is created independently of, and operates independently of the railcar-based mesh networks 105 created by each railcar 103 in the train consist 109.

A bi-directional PWG 102 manages the train-based mesh network 107 and communicates alerts from the CMUs 101 installed on individual railcars 103 to the host or control point, such as the locomotive 108, wherein the alerts or event reports may be acted upon via human intervention, or by an automated system. Locomotive 108 may include a user interface for receiving and displaying alert messages generated by train-based mesh network 107 or any of the individual railcar-based mesh networks 105. Bi-directional PWG 102 is capable of receiving multiple alerts or events from CMUs 101 on individual railcars 103 and can draw inferences about specific aspects of the performance of train consist 109.

Bi-directional PWG 102 is also capable of exchanging information with an external remote railroad operations center 120, data system or other train management system. This communication path is shown in FIG. 3 as reference number 122, and can include cellular, LAN, Wi-Fi, Bluetooth, satellite, or other means of communications. This link can be used to send alerts off-train consist 109 when the train consist 109 is in operation.

It is appreciated that described above are novel systems, devices and methods. It is also understood that the invention is not limited to the embodiments and illustrations described above, and includes the full scope provided by the claims appended hereto.

We claim:

1. A system for detecting operational anomalies on a train consist or railcar comprising:
    (a) one or more communication management units mounted on one or more railcars;
    (b) one or more sensors located on said one or more railcars configured to sense an operational parameter of said one or more railcars, said sensors being in communication with said one or more communication management units, wherein the one or more sensors comprise one or more sensors configured to measure accelerations of the railcar; and
    (c) one or more filters configured to filter at least a portion of the accelerations,
    wherein said communication management units perform the functions of:
        (i) collecting data regarding said one or more railcar operational parameters;
        (ii) analyzing said collected data for trends or events indicative of an anomalous operational condition; and
        (iii) communicating a message to a remote receiver when said trend or event is detected.

2. The system of claim 1 further comprising one or more wireless sensor nodes in communication with one of said communication management units, said one or more sensors forming part of said one or more wireless sensor nodes;
    wherein each of said wireless sensor nodes is configured to:
        collect data from one or more sensors;
        compare said data against one or more rules; and
        send a message to said communication management unit when at least one of said rules is satisfied; and
    wherein said communication management unit and said wireless sensor nodes form a railcar-based wireless mesh network, said railcar-based mesh network being controlled by said communication management unit.

3. The system of claim 2 wherein one of said wireless sensor nodes comprises:
    a) a protective housing;
    b) said one or more sensors being mounted within said protective housing;
    c) a communication capability, for communicating with said communication management unit;
    d) a microprocessor, configured to execute firmware to control the operation of said wireless sensor node; and
    e) a mechanical filter which includes a resilient material selected to filter out undesirable accelerations, said mechanical filter disposed to remove said undesirable accelerations before said undesirable accelerations reach said accelerometer.

4. The system of claim 2 wherein one of said wireless sensor nodes comprises:
    a) a protective housing;
    b) said one or more sensors being mounted within said protective housing;
    c) a communication capability, for communicating with said communication management unit;
    d) a microprocessor, configured to execute firmware to control the operation of said wireless sensor node; and
    e) potting material disposed within said housing, said potting material configured to tune said wireless sensor node by absorbing undesirable accelerations.

5. The system of claim 2 wherein said communication management unit is configured to instruct each wireless sensor node to enable or disable the checking of individual rules by sending a message to said wireless sensor node.

6. The system of claim 2 wherein each of said wireless sensor nodes is configured to:
    a) collect data from one or more sensors; and
    b) periodically send said collected data to said communication management unit.

7. The system of claim 6 wherein said communication management unit is configured to instruct each wireless sensor node to enable or disable the periodic sending of data by sending a message to said wireless sensor node.

8. The system of claim 6 wherein said communication management unit, upon receiving said periodically sent data, is configured to:
    (a) store said data in a data store;
    (b) analyze said stored data for trends; and
    (c) generate a report when trends of interest are detected.

9. The system of claim 2 wherein said one or more rules are numerical thresholds which, when exceeded by said collected data, cause an alert message to be sent to said communication management unit.

10. The system of claim 2 wherein said communication management unit, upon receiving an alert message from one of said wireless sensor nodes, is configured to:
(a) wait to see if similar messages are received from one or more other wireless sensor nodes within a predetermined period of time and concluding that an actual event has occurred if said similar messages are received; and
(b) communicate a message reporting the occurrence of said actual event to a remote receiver.

11. The system of claim 10 wherein said communication management unit is configured to confirm that a lateral extreme vehicle dynamic event has occurred when lateral extreme vehicle dynamic messages have been received from a plurality of wireless sensors nodes within said predetermined period of time.

12. The system of claim 10 wherein said communication management unit is configured to confirm confirms that a vertical extreme vehicle dynamic event has occurred when vertical extreme vehicle dynamic messages have been received from a plurality of wireless sensors nodes within said predetermined period of time.

13. The system of claim 10 wherein said communication management unit is configured to confirm that vertical hunting is occurring when vertical hunting messages are received from wireless sensor nodes mounted on opposite ends of a railcar within a predetermined period of time.

14. The system of claim 13 wherein said communication management unit is configured to determine that a body bounce event has occurred when messages from said wireless sensor nodes indicate that vertical hunting messages received from said wireless sensor nodes indicate in phase accelerations were detected.

15. The system of claim 13 wherein said communication management unit is configured to determine that a body pitch event has occurred when messages from said wireless sensor nodes indicate that vertical hunting messages received from said wireless sensor nodes indicate out of phase accelerations were detected.

16. The system of claim 10 wherein said communication management unit is configured to confirm that lateral hunting is occurring when lateral hunting messages are received from wireless sensor nodes mounted on opposite ends of a railcar within a predetermined period of time.

17. The system of claim 16 wherein said communication management unit is configured to determine that a body yaw event has occurred when messages from said wireless sensor nodes indicate that lateral hunting messages received form said wireless sensor nodes indicate out of phase accelerations were detected.

18. The system of claim 16 wherein said communication management unit is configured to determine that a body roll event has occurred when messages from said wireless sensor nodes indicate that lateral hunting messages received form said wireless sensor nodes indicate in phase accelerations were detected.

19. The system of claim 1 further comprising a powered wireless gateway controlling a train-based wireless mesh network that includes said powered wireless gateway and a plurality of said communication management units.

20. The system of claim 19 wherein said powered wireless gateway serves as said remote receiver.

21. The system of claim 1 wherein at least one of said communication management units includes at least one of said sensors.

22. The system of claim 1 further comprising a powered wireless gateway configured to control a train-based network that includes said powered wireless gateway and a plurality of said communication management units.

23. The system of claim 1, wherein the one or more filters comprise one or more mechanical filters that include a resilient material configured to filter out undesirable accelerations from the accelerations, wherein the one or more mechanical filters are disposed to remove the undesirable accelerations before the undesirable accelerations reach the one or more sensors that are configured to measure accelerations.

24. The system of claim 1, further comprising one or more wireless sensor nodes in communication with at least one of the communication management units, wherein the one or more sensors form part of the one or more wireless sensor nodes, wherein one or more of the wireless sensor nodes comprise a protective housing, wherein the one or more sensors are mounted within the protective housing, wherein the protective housing comprises potting material configured to tune the wireless sensor nodes by absorbing at least a portion of undesirable accelerations.

25. The system of claim 1, further comprising one or more wireless sensor nodes in communication with at least one of the communication management units, wherein the one or more sensors form part of the one or more wireless sensor nodes, wherein one or more of the wireless sensor nodes comprises a microprocessor configured to execute firmware to control operation of the one or more of the wireless sensor nodes, wherein the firmware comprises one or more software filters configured to isolate one or more types of accelerations.

26. The system of claim 1, wherein the one or more filters comprise one or more mechanical filters.

27. The system of claim 1, wherein the one or more filters comprise one or more electronic filters.

28. The system of claim 1, wherein the one or more filters comprise one or more digital filters.

29. The system of claim 1 wherein said remote receiver is located off-train.

30. A method for detecting operational anomalies on a train consist or railcar comprising the steps of:
sensing, by one or more sensors located on one or more railcars, one or more operational parameters of the one or more railcars, wherein the one or more operational parameters comprise one or more accelerations of the one or more railcars;
filtering, by one or more filters, at least a portion of the accelerations; and
by one or more communication management units associated with the one or more railcars:
collecting data regarding said one or more railcar operational parameters;
analyzing said collected data for trends or events indicative of an anomalous operational condition; and
communicating a message to a remote receiver when said trend or event is detected.

31. The method of claim 30 wherein
said data is collected from one or more wireless sensor nodes on said railcar, said wireless sensor nodes being in communication with said communication management unit and comprising one or more of the sensors; and
wherein said communication management unit and said one or more wireless sensor nodes form a railcar-based mesh network.

32. The method of claim 31 wherein said wireless sensor nodes are each configured to:
(a) collect data from one or more sensors;

(b) compare said data against one or more rules; and
(c) send a message to said communication management unit when at least one of said rules is satisfied; and
wherein said one or more rules causes data collected from some sensors to be periodically sent to said communication management unit.

33. The method of claim 32 wherein said communication management units are configured to coordinate messages from two or more wireless sensor nodes to confirm that an event has occurred.

34. The method of claim 31 wherein multiple railcars in said train consist are configured with a communication management unit and further wherein all communication management units on said train consist are configured in a train-based wireless mesh network controlled by a powered wireless gateway.

35. A system for detecting operational anomalies on a train consist or railcar comprising:
   (a) a train-based mesh network comprising a powered wireless gateway and one or more communication management units located on one or more railcars in said train consist;
   (b) one or more railcar-based mesh networks each comprising at least said one or more communication management units, each arranged in a mesh network configuration with one or more wireless sensor nodes;
   (c) a distributed event processing engine that executes within the said wireless sensor nodes, said communication management units and said powered wireless gateway, said distributed event processing engine detecting anomalous operating conditions on said train consist via data gathered by sensors controlled by said wireless sensor nodes and propagated upwards through said system.

36. A system for detecting operational anomalies on a railcar that is part of a train consist comprising:
   (a) at least one communication management unit (CMU) mounted on the a railcar in said train consist;
   (b) at least two sensors located on the said railcar for configured to sense operational parameters of the railcar, said sensors being in communication with said communication management unit, wherein the one or more sensors comprise one or more sensors configured to measure accelerations of the railcar; and
   (c) one or more filters configured to filter at least a portion of the accelerations,
   wherein said communication management unit performs the following functions:
      (i) receiving data from said sensors;
      (ii) drawing inferences from the data received from at least two of the sensors regarding the performance of the railcar; and
      (iii) communicating a message to a remote receiver when an anomaly is detected.

37. The system of claim 36,
wherein said sensors comprise accelerometers positioned at different locations of the railcar,
wherein said step of drawing inferences comprises the comparison of data from two or more of said accelerometers,
wherein said accelerometers are positioned on the railcar to provide data for carrying out one or more of the following functions:
   i) compare accelerations from one railcar wheel with that of another railcar wheel on the same axle but opposite side of the railcar,
   ii) compare accelerations from one railcar wheel with that of at least one other wheel on the same side of said railcar, and
   iii) compare accelerations from one railcar wheel with that of at least one other railcar wheel on the same side of said one railcar wheel and which other wheel is on another railcar of the same train consist.

* * * * *